(12) United States Patent
Kato

(10) Patent No.: US 10,808,130 B2
(45) Date of Patent: Oct. 20, 2020

(54) PROTECTIVE SHEET, IMAGE DISPLAY DEVICE, SPECTACLE LENS, AND SPECTACLES

(71) Applicant: FUJIFILM CORPORATION, Minato-ku, Tokyo (JP)

(72) Inventor: Takashi Kato, Shizuoka (JP)

(73) Assignee: FUJIFILM CORPORATION, Tokyo (JP)

( * ) Notice: Subject to any disclaimer, the term of this patent is extended or adjusted under 35 U.S.C. 154(b) by 222 days.

(21) Appl. No.: 16/120,437

(22) Filed: Sep. 3, 2018

(65) Prior Publication Data

US 2018/0371255 A1    Dec. 27, 2018

Related U.S. Application Data

(63) Continuation of application No. PCT/JP2017/006904, filed on Feb. 23, 2017.

(30) Foreign Application Priority Data

Mar. 29, 2016 (JP) .................. 2016-066812
Aug. 31, 2016 (JP) .................. 2016-169842
Oct. 28, 2016 (JP) .................. 2016-212257

(51) Int. Cl.
| | |
|---|---|
| C09B 23/16 | (2006.01) |
| C09B 57/00 | (2006.01) |
| C08F 222/10 | (2006.01) |
| G02B 5/22 | (2006.01) |
| G02C 7/10 | (2006.01) |
| C08F 2/44 | (2006.01) |
| C09B 23/14 | (2006.01) |
| C09B 23/10 | (2006.01) |
| C08K 5/00 | (2006.01) |
| C08K 5/3472 | (2006.01) |
| C08K 5/353 | (2006.01) |
| G02B 1/04 | (2006.01) |

(52) U.S. Cl.
CPC ............ *C09B 23/164* (2013.01); *C08F 2/44* (2013.01); *C08F 222/1006* (2013.01); *C08K 5/0041* (2013.01); *C08K 5/3472* (2013.01); *C08K 5/353* (2013.01); *C09B 23/107* (2013.01); *C09B 23/143* (2013.01); *C09B 57/00* (2013.01); *G02B 1/041* (2013.01); *G02B 5/22* (2013.01); *G02C 7/104* (2013.01); *G02B 2207/109* (2013.01)

(58) Field of Classification Search
CPC .................................................. C09B 23/164
USPC ................................................... 351/159.01
See application file for complete search history.

(56) References Cited

U.S. PATENT DOCUMENTS

| | | | |
|---|---|---|---|
| 5,776,667 A | 7/1998 | Ohlschlager et al. | |
| 2010/0118263 A1 | 5/2010 | Tamura et al. | |
| 2014/0045106 A1* | 2/2014 | Fujita | C09B 23/04 430/7 |
| 2014/0198374 A1 | 7/2014 | Fukushige et al. | |
| 2015/0293281 A1 | 10/2015 | Ezoe et al. | |

FOREIGN PATENT DOCUMENTS

| | | |
|---|---|---|
| CN | 101652700 A | 2/2010 |
| CN | 103189413 A | 7/2013 |
| CN | 105102560 A | 11/2015 |
| JP | 2010-262058 A | 11/2010 |

(Continued)

OTHER PUBLICATIONS

Office Action dated Dec. 4, 2018, issued by the JPO in corresponding Japanese Patent Application No. 2018-508791.
(Continued)

*Primary Examiner* — James C. Jones
(74) *Attorney, Agent, or Firm* — Solaris Intellectual Property Group, PLLC

(57) ABSTRACT

Provided are a protective sheet and a spectacle lens including at least one dye selected from the group consisting of a dye represented by Formula (1) and a dye represented by Formula (2), and application thereof. In Formula (1), $R^{71}$ to $R^{74}$ each independently represent a hydrogen atom, an alkyl group, an alkoxy group, or the like. In Formula (2), $R^{21}$ represents an alkyl group, an aryl group, a heterocyclic group, or the like, $R^{22}$ represents a hydrogen atom, a halogen atom, an alkyl group, or the like, and at least one of $R^{21}$ or $R^{22}$ is an alkyl group having 4 or more carbon atoms. n represents 0 or 1, and m represents an integer of 1 to 5.

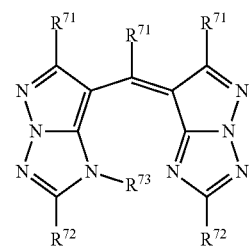

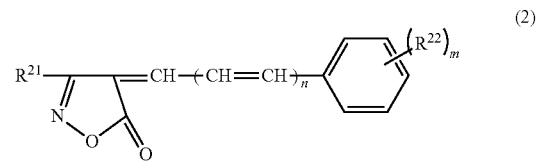

11 Claims, No Drawings

(56) References Cited

FOREIGN PATENT DOCUMENTS

| JP | 2014-025010 A | 2/2014 |
|----|---------------|--------|
| JP | 2015-017152 A | 1/2015 |
| JP | 2015-87690 A | 5/2015 |
| WO | 2012/147954 A1 | 11/2012 |
| WO | 2013/047757 A1 | 4/2013 |

OTHER PUBLICATIONS

Extended European Search Report dated Mar. 29, 2019, issued in corresponding EP Patent Application No. 17773915.8.
International Search Report issued in International Application No. PCT/JP2017/006904 dated May 23, 2017.
Written Opinion of the ISA issued in International Application No. PCT/JP2017/006904 dated May 23, 2017.
English language translation of the following: Office action dated Mar. 26, 2020 from the SIPO in a Chinese patent application No. 201780019168.9 corresponding to the instant patent application. This office action translation is submitted now in order to supplement the understanding of the cited references which are being disclosed in the instant Information Disclosue Statement.

* cited by examiner

PROTECTIVE SHEET, IMAGE DISPLAY DEVICE, SPECTACLE LENS, AND SPECTACLES

CROSS-REFERENCE TO RELATED APPLICATION

This application is a continuation application of International Application No. PCT/JP2017/006904, filed Feb. 23, 2017, the disclosure of which is incorporated herein by reference in its entirety. Further, this application claims priority from Japanese Patent Application No. 2016-066812, filed Mar. 29, 2016, Japanese Patent Application No. 2016-169842, filed Aug. 31, 2016, and Japanese Patent Application No. 2016-212257, filed Oct. 28, 2016, the disclosures of which are incorporated herein by reference in their entirety.

BACKGROUND OF THE INVENTION

1. Field of the Invention

The present disclosure relates to a protective sheet, an image display device, a spectacle lens, and spectacles.

2. Description of the Related Art

In an image display device such as a cathode ray tube display device, a plasma display, an electroluminescent display, a fluorescent display, a field emission display, and a liquid crystal display (LCD), or various displays such as a smart phone mounted with a touch panel or a tablet terminal, a protective sheet including a resin is provided on a surface of an image display portion in order to prevent scratches on an image display surface.

In a case where a device provided with a display such as an image display device or a small terminal is used, the screen of the display provided with a light source is visually observed. In recent years, attention has been paid to the influence of blue light on the retina in a case where an image display device, a small terminal mounted with a touch panel, or the like is used for a long period of time. Attempts have been made to absorb the blue light with a protective sheet for display in order to reduce the influence of blue light having a wavelength of 400 nm to 500 nm so as to reduce the influence on the eyes of the user.

As another countermeasure, attempts have been made to reduce the influence of blue light on the eyes of the user by causing the blue light to be absorbed by a spectacle lens worn in a case where the screen of the display provided with the light source is visually observed.

Examples of the protective sheet for causing the blue light to be absorbed include a protective sheet containing a yellow coloring dye having a maximum absorption wavelength in the range of 400 nm to 500 nm.

For example, a resin composition for cutting blue light containing 20 parts by mass to 60 parts by mass of a purple coloring agent with respect to 100 parts by mass of a yellow coloring agent and a resin formed body formed of the resin composition for cutting blue light have been proposed (for example, see JP2015-17152A). A lamination film in which a tone correction layer is laminated on a transparent substrate film, and the tone correction layer have an absorption at a wavelength of 380 nm to 495 nm and contains an oxonol-based methine coloring agent having a specific structure has been proposed (for example, see JP2015-87690A).

SUMMARY OF THE INVENTION

However, according to the studies of the present inventors, in a protective film including the resin composition for cutting blue light disclosed in JP2015-17152A, it is required to use two kinds of coloring agents having different hues in combination, and light in the ultraviolet range can be blocked due to the contained yellow and purple coloring agents. However, there are problems in that absorption is not sufficient in the vicinity of 480 nm, which is a wavelength at which the effect of blocking the blue-colored light in the visible light range, that is, blue light is excellent, and the protective film disclosed in that document cannot sufficiently block blue light in the visible light range.

The oxonol-based methine coloring agent used in the lamination film disclosed in JP2015-87690A has an absorption in a wavelength range useful for blocking blue light in the visible light range. However, since the absorption curve in the wavelength range described above is broad and the absorption on the longer wavelength side with respect to the maximum absorption is provided, there is a problem in that the hue of the lamination film is reddish. Since the red hue is easily observed visually, and the hue of the lamination film is reddish by visual observation, there is a problem in that the color reproducibility of a display image cannot be sufficiently obtained.

An object to be solved by an embodiment of the present invention is to provide a protective sheet which can block at least the blue light in the visible light range and has satisfactory color reproducibility of a display image or the like and an image display device having the protective sheet.

Another object to be solved by another embodiment of the present invention is to provide a spectacle lens which can block at least blue light in the visible light range and has satisfactory color reproducibility of an image, an article, or the like which is a visual observation target, and spectacles provided with the spectacle lens.

The present disclosure includes the following embodiment.

<1> A protective sheet comprising: at least one dye selected from the group consisting of a dye represented by Formula (1) and a dye represented by Formula (2),

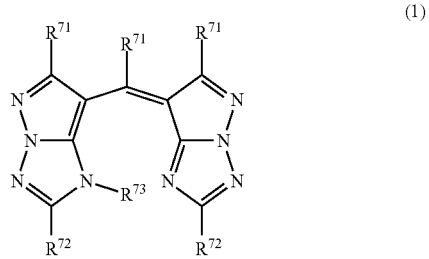

in Formula (1), $R^{71}$, $R^{72}$, $R^{73}$, and $R^{74}$ each independently represent a hydrogen atom, an alkyl group, an alkoxy group, an alkoxycarbonyl group, a carbamoyl group, a sulfamoyl group, a cyano group, an aryl group, or a heteroaryl group,

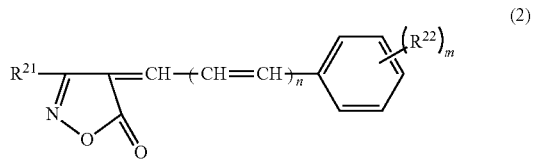

in Formula (2), $R^{21}$ represents an alkyl group, an aryl group, a heterocyclic group, a carboxyl group, an alkoxycarbonyl group, an aryloxycarbonyl group, a carbamoyl group, or a cyano group, $R^{22}$ represents a hydrogen atom, a halogen atom, an alkyl group, an alkoxy group, a hydroxy group, an amino group, a carbamoyl group, a sulfamoyl group, or an alkoxycarbonyl group, $R^{22}$ may form a 5-membered or 6-membered fused ring together with a benzene ring to which $R^{22}$ is bonded, and n represents 0 or 1, and m represents an integer of 1 to 5, where, at least one of $R^{21}$ or $R^{22}$ is an alkyl group having 4 or more carbon atoms, and in a case where m is 2 to 5, a plurality of $R^{22}$'s may be identical to or different from each other.

<2> The protective sheet according to <1>, in which, in at least one dye selected from the group consisting of the dye represented by Formula (1) and the dye represented by Formula (2), a maximum absorption wavelength is in a range of 450 nm to 500 nm, and visible light transmittance at the maximum absorption wavelength is less than 60%.

<3> The protective sheet according to <1> or <2>, comprising: a coloring agent-containing layer that includes at least one dye selected from the group consisting of the dye represented by Formula (1) and the dye represented by Formula (2) on at least one surface of a transparent support.

<4> The protective sheet according to <3>, in which the coloring agent-containing layer is a cured product of a curable composition including at least one dye selected from the group consisting of the dye represented by Formula (1) and the dye represented by Formula (2), a polymerizable compound, and a polymerization initiator.

<5> The protective sheet according to <3> or <4>, in which the coloring agent-containing layer further includes a pressure sensitive adhesive.

<6> The protective sheet according to any one of <1> to <5>, further comprising: a colorant different from at least one dye selected from the group consisting of the dye represented by Formula (1) and the dye represented by Formula (2).

<7> An image display device comprising: the protective sheet according to any one of <1> to <6>.

<8> A spectacle lens comprising: at least one dye selected from the group consisting of a dye represented by Formula (1) and a dye represented by Formula (2),

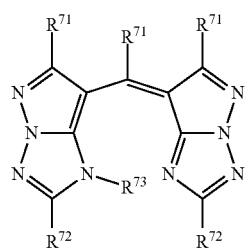

(1)

in Formula (1), $R^{71}$, $R^{72}$, $R^{73}$, and $R^{74}$ each independently represent a hydrogen atom, an alkyl group, an alkoxy group, an alkoxycarbonyl group, a carbamoyl group, a sulfamoyl group, a cyano group, an aryl group, or a heteroaryl group,

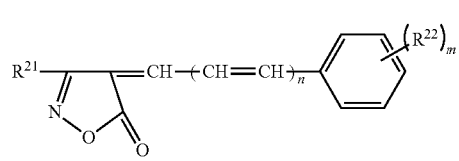

(2)

in Formula (2), $R^{21}$ represents an alkyl group, an aryl group, a heterocyclic group, a carboxyl group, an alkoxycarbonyl group, an aryloxycarbonyl group, a carbamoyl group, or a cyano group, $R^{22}$ represents a hydrogen atom, a halogen atom, an alkyl group, an alkoxy group, a hydroxy group, an amino group, a carbamoyl group, a sulfamoyl group, or an alkoxycarbonyl group, $R^{22}$ may form a 5-membered or 6-membered fused ring together with a benzene ring to which $R^{22}$ is bonded, and n represents 0 or 1, and m represents an integer of 1 to 5, where, at least one of $R^{21}$ or $R^{22}$ is an alkyl group having 4 or more carbon atoms, and in a case where m is 2 to 5, a plurality of $R^{22}$'s may be identical to or different from each other.

<9> The spectacle lens according to <8>, in which, in at least one dye selected from the group consisting of the dye represented by Formula (1) and the dye represented by Formula (2), a maximum absorption wavelength is in a range of 450 nm to 500 nm, and visible light transmittance at the maximum absorption wavelength is less than 60%.

<10> The spectacle lens according to <8> or <9>, comprising: a transparent lens; and a coloring agent-containing layer that is arranged on at least one surface of the transparent lens and that includes at least one dye selected from the group consisting of the dye represented by Formula (1) and the dye represented by Formula (2).

<11> The spectacle lens according to <10>, in which the coloring agent-containing layer is a cured product of a curable composition including at least one dye selected from the group consisting of the dye represented by Formula (1) and the dye represented by Formula (2), a polymerizable compound, and a polymerization initiator.

<12> The spectacle lens according to <10>, in which the coloring agent-containing layer is a sol-gel film.

<13> The spectacle lens according to <8> or <9>, in which the transparent lens includes at least one dye selected from the group consisting of the dye represented by Formula (1) and the dye represented by Formula (2).

<14> The spectacle lens according to any one of <8> to <13>, further comprising: a colorant different from at least one dye selected from the group consisting of the dye represented by Formula (1) and the dye represented by Formula (2).

<15> Spectacles comprising: the spectacle lens according to any one of <8> to <14>.

According to an embodiment of the present invention, it is possible to provide a protective sheet which can block at least blue light in the visible light range and has satisfactory color reproducibility of a display image and an image display device having the protective sheet.

According to another embodiment of the present invention, it is possible to provide a spectacle lens which can block at least blue light in the visible light range and which has satisfactory color reproducibility of an image, an article, or the like which is a visual observation target, and spectacles provided with the spectacle lens.

The expression "color reproducibility is satisfactory" in the present specification means that an observer hardly feels a change in tint in a case where a target is visually observed via a protective sheet or a spectacle lens.

DESCRIPTION OF THE PREFERRED EMBODIMENTS

Hereinafter, the protective sheet of the present disclosure, the spectacle lens of the present disclosure, and the like are described in detail. The following description of components may be made based on representative embodiments or specific examples, but the present disclosure is not limited to the embodiments as below.

According to the present specification, the numerical range expressed by using "to" means a range including numerical values described before and after "to" as a lower limit value and an upper limit value.

In the present specification, in a case where there are a plurality of kinds of substances corresponding to each component in a sheet or a composition, an amount of each component in the sheet or the composition means a total amount of the plurality of kinds of the corresponding substances which are present in the sheet or the composition, unless described otherwise.

In the numerical ranges described in a stepwise manner in this specification, an upper limit value or a lower limit value described in one numerical value range may be replaced with an upper limit value or a lower limit value in another numerical range described in a stepwise manner. In the numerical ranges described in this specification, the upper limit value or the lower limit value of the numerical range may be replaced with values described in the examples.

In the present specification, a "(meth)acryloyl group" refers to either or both of an "acryloyl group" and a "methacryloyl group", "(meth)acrylate" refers to either or both of "acrylate" and "methacrylate", and "(meth)acryl" refers to either or both of "acryl" and "methacryl".

In the present specification, the expression "room temperature" means 25° C., unless described otherwise.

In the present specification, the blocking of the blue light means not only the case where the blue light is completely blocked but also the case where at least a part of the blue light via a protective sheet or a spectacle lens is blocked so as to reduce the transmittance of the blue light.

[Protective Sheet]

The protective sheet of the present disclosure is a protective sheet including at least one dye selected from the group consisting of a dye represented by Formula (1) and a dye represented by Formula (2). That is, the protective sheet of the present disclosure is a protective sheet that is arranged on various displays such as displays of various image display devices or various displays of a smart phone, a tablet terminal, and the like and that can be used for the purpose of blocking blue light emitted from the display.

Hereinafter, each component included in the protective sheet will be sequentially explained.

<Dye represented by Formula (1)>

Hereinafter, the dye represented by Formula (1) is described.

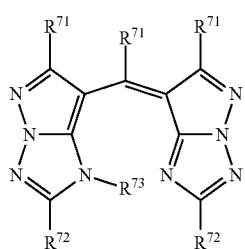

(1)

In Formula (1), $R^{71}$, $R^{72}$, $R^{73}$, and $R^{74}$ each independently represent a hydrogen atom, an alkyl group, an alkoxy group, an alkoxycarbonyl group, a carbamoyl group, a sulfamoyl group, a cyano group, an aryl group, or a heteroaryl group.

The alkyl group in $R^{71}$, $R^{72}$, $R^{73}$, and $R^{74}$ is preferably an alkyl group having 1 to 48 carbon atoms and more preferably an alkyl group having 1 to 18 carbon atoms. The alkyl group may have any one of a linear shape, a branched shape, or a cyclic shape. Examples of the alkyl group include a methyl group, an ethyl group, a propyl group, an isopropyl group, a butyl group, a t-butyl group, a pentyl group, a hexyl group, a heptyl group, an octyl group, a 2-ethylhexyl group, a dodecyl group, a hexadecyl group, a cyclopropyl group, a cyclopentyl group, a cyclohexyl group, a 1-norbornyl group, and an 1-adamantyl group, and preferable examples thereof include a methyl group, an ethyl group, a propyl group, an isopropyl group, a butyl group, a t-butyl group, a pentyl group, a hexyl group, a heptyl group, an octyl group, and a 2-ethylhexyl group.

The alkoxy group in $R^{71}$, $R^{72}$, $R^{73}$, and $R^{74}$ is preferably an alkoxy group having 1 to 48 carbon atoms and more preferably an alkoxy group having 1 to 12 carbon atoms. Examples of the alkoxy group include a methoxy group, an ethoxy group, a 1-butoxy group, a 2-butoxy group, an isopropoxy group, a t-butoxy group, a dodecyloxy group, and a cycloalkyloxy group, and examples of the cycloalkyloxy group include a cyclopentyloxy group, and a cyclohexyloxy group. The alkoxy group is preferably a methoxy group, an ethoxy group, a 1-butoxy group, a 2-butoxy group, an isopropoxy group, and a t-butoxy group.

The alkoxycarbonyl group in $R^{71}$, $R^{72}$, $R^{73}$, and $R^{74}$ is preferably an alkoxycarbonyl group having 2 to 48 carbon atoms and is more preferably an alkoxycarbonyl group having 2 to 12 carbon atoms, and examples thereof include a methoxycarbonyl group, an ethoxycarbonyl group, an octadecyloxycarbonyl group, and a cyclohexyloxycarbonyl group. The alkoxycarbonyl group is preferably a methoxycarbonyl group or an ethoxycarbonyl group.

The carbamoyl group in $R^{71}$, $R^{72}$, $R^{73}$, and $R^{74}$ is preferably a carbamoyl group having 1 to 48 carbon atoms and more preferably a carbamoyl group having 1 to 12 carbon atoms, and examples thereof include a carbamoyl group, an N,N-diethylcarbamoyl group, an N-ethyl-N-octylcarbamoyl group, an N,N-dibutylcarbamoyl group, an N-propylcarbamoyl group, an N-phenylcarbamoyl group, an N-methyl-N-phenylcarbamoyl group, and an N,N-dicyclohexylcarbamoyl group, and preferable examples thereof include an N-ethyl-N-octylcarbamoyl group, an N,N-dibutylcarbamoyl group, an N-propylcarbamoyl group, and an N-phenylcarbamoyl group.

The sulfamoyl group in $R^{71}$, $R^{72}$, $R^{73}$, and $R^{74}$ is preferably a sulfamoyl group having 32 or less carbon atoms and is more preferably a sulfamoyl group having 16 or less carbon atoms, examples thereof include a sulfamoyl group, an N,N-dipropylsulfamoyl group, an N-ethyl-N-dodecylsulfamoyl group, an N-ethyl-N-hexylsulfamoyl group, an N-ethyl-N-phenylsulfamoyl group, and an N-cyclohexylsulfamoyl group, and preferable examples thereof include an N-ethyl-N-hexylsulfamoyl group, an N-ethyl-N-phenylsulfamoyl group, and an N-cyclohexylsulfamoyl group.

The aryl group in $R^{71}$, $R^{72}$, $R^{73}$, and $R^{74}$ is preferably an aryl group having 6 to 48 carbon atoms and more preferably is an aryl group having 6 to 12 carbon atoms, examples thereof include a phenyl group and a naphthyl group, and preferable examples thereof include a phenyl group.

The heteroaryl group in $R^{71}$, $R^{72}$, $R^{73}$, and $R^{74}$ is preferably a heteroaryl group having 1 to 32 carbon atoms and more preferably a heteroaryl group having 1 to 12 carbon atoms, examples thereof include a 2-thienyl group, a 4-pyridyl group, a 2-furyl group, a 2-pyrimidinyl group, a 1-pyridyl group, a 2-benzothiazolyl group, a 1-imidazolyl group, a 1-pyrazolyl group, and a benzotriazol-1-yl group, and preferable examples thereof include a 2-benzothiazolyl group, a 1-imidazolyl group, a 1-pyrazolyl group, and a benzotriazol-1-yl group.

$R^{71}$ is preferably an alkyl group having 1 to 8 carbon atoms which may have a substituent, an aryl group having 6 to 12 carbon atoms which may have a substituent, and a cyano group and is more preferably a methyl group, an ethyl group, an isopropyl group, a t-butyl group, a phenyl group, or an o-methylphenyl group.

$R^{73}$ and $R^{74}$ are preferably a hydrogen atom, the structure of $R^{72}$ is not particularly limited, but an alkoxycarbonyl group, a carbamoyl group, or a sulfamoyl group is preferable, and an alkoxycarbonyl group, a carbamoyl group, and a sulfamoyl group preferably have a substituted alkyl group, a polyethylene glycol (PEG) chain, a polypropylene glycol (PPG) chain, an ammonium salt, or a polymerizable group in the structure. $R^{72}$ is more preferably a sulfamoyl group.

A plurality of $R^{71}$'s and $R^{72}$'s that are present in Formula (1) may be identical to or different from each other, but are preferably identical to each other, in view of synthetic aptitude.

The dye represented by Formula (1) is preferably a dye represented by Formula (1-2).

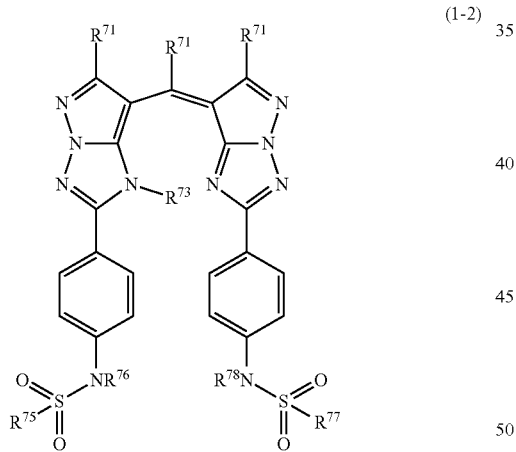

(1-2)

In Formula (1-2), $R^{71}$, $R^{73}$, and $R^{74}$ are respectively identical to $R^{71}$, $R^{73}$, and $R^{74}$ in Formula (1). $R^{76}$ and $R^{78}$ each independently represent a hydrogen atom or an alkyl group having 1 to 48 carbon atoms, and $R^{75}$ and $R^{77}$ each independently represent an alkyl group having 1 to 48 carbon atoms, an aryl group having 6 to 48 carbon atoms, or a heteroaryl group having 1 to 32 carbon atoms.

Examples of the alkyl group, the aryl group, and the heteroaryl group in $R^{76}$ and $R^{78}$ include those which are identical to the alkyl group, the aryl group, and the heteroaryl group in $R^{71}$, $R^{72}$, $R^{73}$, and $R^{74}$.

Specific examples [Example Compounds (Y-1) to (Y-4)] of the dye represented by Formula (1) are provided below. The dye represented by Formula (1) is not limited to the following example.

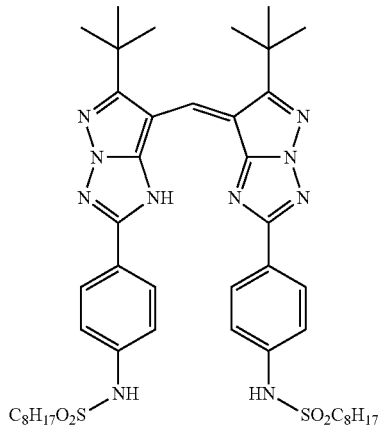

Y-1

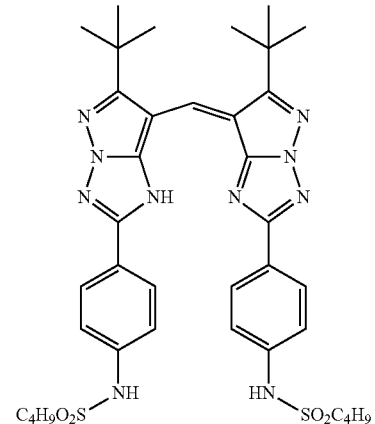

Y-2

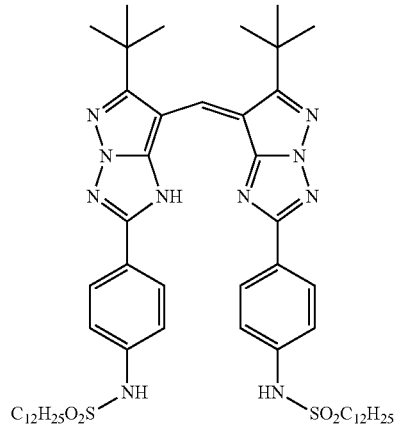

Y-3

Y-4

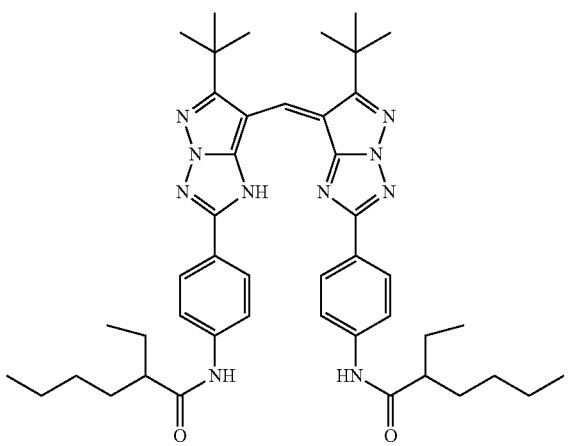

The dye represented by Formula (1) is specifically disclosed, for example, as a compound represented by Formula (VI) in paragraphs [0060] to [0071] of JP2013-160860A. The Example Compounds (B-1) to (B-9) disclosed in paragraph [0071] in the same patent document can be applied to the dye represented by Formula (1).

The dye represented by Formula (1) preferably has maximum absorption at a wavelength of 450 nm to 500 nm and the visible light transmittance at the maximum absorption wavelength of the dye is preferably less than 60%.

The maximum absorption wavelength of the dye can be measured by spectroscopically measuring a 0.005 mass % solution of the dye prepared by dissolving the dye in methylene chloride at room temperature (25° C.) by using a 1 cm quartz cell.

The maximum absorption wavelength of the dye in the present specification indicates the maximum absorption wavelength λ max in a case where spectroscopically measurement is performed by using a UV/vis spectrometer UV 3400 manufactured by Shimadzu Corporation. The absorbance (Abs) at the maximum absorption wavelength range is measured by the spectroscopic spectrum, and the visible light transmittance can be checked from the absorbance.

<Dye Represented by Formula (2)>

Hereinafter, the dye represented by Formula (2) is described below.

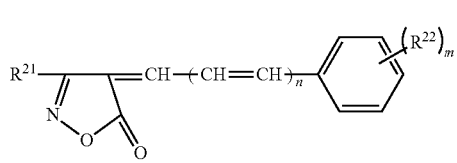
(2)

In Formula (2), $R^{21}$ represents an alkyl group, an aryl group, a heterocyclic group, a carboxyl group, an alkoxycarbonyl group, an aryloxycarbonyl group, a carbamoyl group, or a cyano group. $R^{22}$ represents a hydrogen atom, a halogen atom, an alkyl group, an alkoxy group, a hydroxy group, an amino group, a carbamoyl group, a sulfamoyl group, or an alkoxycarbonyl group. $R^{22}$ may form a 5-membered or 6-membered fused ring together with a benzene ring to which $R^{22}$ is bonded.

n represents 0 or 1, and m represents an integer of 1 to 5. Here, at least one of $R^{21}$ or $R^{22}$ is an alkyl group having 4 or more carbon atoms. In a case where m is 2 to 5, a plurality of $R^{22}$'s may be identical to or different from each other.

The alkyl group in $R^{21}$ may be linear, branched, or cyclic, that is, may be a cycloalkyl group.

Preferable examples of the linear or branched alkyl group include alkyl groups having 1 to 22 carbon atoms. Examples of the linear or branched alkyl group include a methyl group, an ethyl group, a propyl group, an isopropyl group, a butyl group, a t-butyl group, a pentyl group, a hexyl group, a heptyl group, an octyl group, a 2-ethylhexyl group, a dodecyl group, and a hexadecyl group.

The linear or branched alkyl group may have a substituent. Examples of the substituent that may be introduced to the linear or branched alkyl group include a halogen atom, a cyano group, an alkoxy group, a hydroxy group, an amino group, an alkoxycarbonyl group, and an aryloxycarbonyl group.

Examples of the cycloalkyl group include a cyclopentyl group, a cycloheptyl group, and a cyclooctyl group.

The heterocyclic group in $R^{21}$ is preferably a heterocyclic group including a nitrogen atom, an oxygen atom, or a sulfur atom, and examples thereof include a 2-thienyl group and a 4-pyridyl group.

The aryl moiety included in the aryl group or the aryloxycarbonyl group in $R^{21}$ is preferably an aryl group having 6 to 48 carbon atoms and more preferably an aryl group having 6 to 12 carbon atoms, and examples thereof include a phenyl group and a naphthyl group. The aryl moiety in the aryl group or the aryloxycarbonyl group may further have a substituent. Examples of the substituent that can be introduced include an alkyl group, an alkoxy group, a halogen atom, a nitro group, a cyano group, a hydroxy group, a carboxy group, a carbamoyl group, a sulfo group, a sulfamoyl group, an alkoxycarbonyl group, and an amino group.

The alkyl moiety included in the alkoxycarbonyl group in $R^{21}$ and $R^{22}$ and the alkoxy group in $R^{22}$ have the same meaning as the above alkyl group.

In a case where $R^{21}$ and $R^{22}$ are carbamoyl groups and $R^{22}$ is a sulfamoyl group, the carbamoyl group and the sulfamoyl group may have an alkyl group or an aryl group as the substituent in $R^{21}$.

Examples of the halogen atom in $R^{22}$ include a fluorine atom, a chlorine atom, a bromine atom, and an iodine atom.

The amino group in $R^{22}$ may have the aforementioned alkyl group, the aforementioned aryl group, $-COR^1$, $-SO_2R^1$, or the like, as a substituent. Here, $R^1$ represents an alkyl group or an aryl group, and the alkyl group and the aryl group have the same meaning as the aforementioned alkyl group or aryl group.

The dye represented by Formula (2) is preferably a dye represented by Formula (2-2).

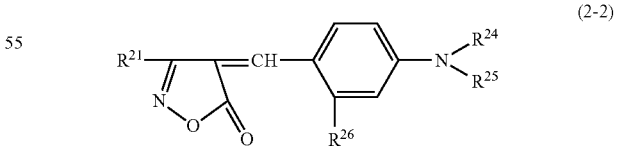
(2-2)

In Formula (2-2), $R^{23}$ represents an alkyl group, and is preferably an alkyl group having a branched chain.

$R^{24}$ and $R^{25}$ each independently represent an alkyl group, and $R^{24}$ and $R^{25}$ are linked to each other to form a 5-membered ring or a 6-membered ring. Here, at least one of $R^{23}$, or $R^{24}$, $R^{25}$, and $R^{26}$ is an alkyl group having 4 or more carbon atoms.

Examples of the alkyl group having 4 or more carbon atoms include an alkyl group having 4 or more carbon atoms among the alkyl groups exemplified as the alkyl group in $R^{21}$.

$R^{26}$ in Formula (2-2) is the same as $R^{22}$ in Formula (2), and preferable aspects are also the same.

Specific examples [Example Compounds (Z-1) to (Z-4)] of the dye represented by Formula (2) are provided below. The dye represented by Formula (2) is not limited to the following specific examples.

(Z-1)
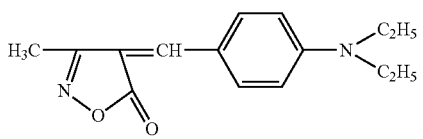

(Z-2)
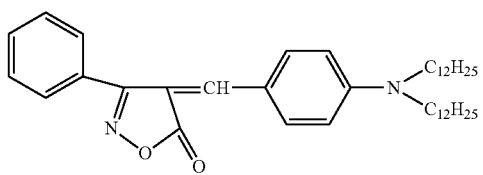

(Z-3)
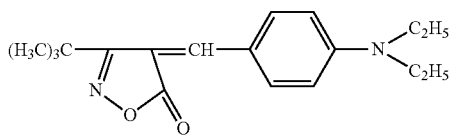

(Z-4)
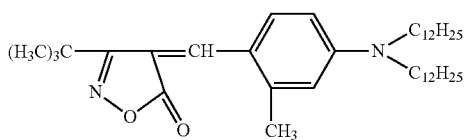

For example, the dye represented by Formula (2) is specifically disclosed in JP1991-171137A (JP03-171137A) as a water-insoluble dye represented by Formula (1), and the dye may be referred to. The disclosure of Formula (1) in the lower left column of page 4 to the description of the substituents disclosed on the third line of the lower left column of page 5, and the dye represented by Compound Nos. 1 to 28 disclosed in page 7 of the patent document can be applied as the dye represented by Formula (2).

The dye represented by Formula (2) preferably has maximum absorption having a wavelength of 450 nm to 500 nm, and the visible light transmittance at the maximum absorption wavelength of the dye is preferably less than 60%.

The maximum absorption wavelength and the visible light transmittance of the dye can be measured by the method as described in the description of the dye represented by Formula (1).

The action according to one embodiment of the present disclosure is not clear, but is considered as below.

It has been known that the blue light in the visible light range can be blocked to some extent with a yellow coloring agent having an absorption maximum at a wavelength of 400 nm to 500 nm. The present inventors have paid attention to the absorption characteristics of the dye and have found that, since the peak of the maximum absorption wavelength in the absorption spectrum of the dye is sharply exhibited, the objects have been solved by using the dye represented by Formula (1) and the dye represented by Formula (2) as the dye having remarkably low absorption on the shorter wavelength side or the longer wavelength side than the maximum absorption wavelength.

For example, the present inventors have found that, even in a case of the dye having the maximum absorption at a wavelength of 400 nm to 500 nm, in a case where a dye having absorption on the longer wavelength side is used, blocking properties of the blue light may be slightly obtained, but the fact that the hue of the protective sheet is reddish, the hue which is reddish such as orange or red can be visually observed, and color reproducibility in a case where the display image of the display is visually observed via the protective sheet is decreased.

It is assumed that, since the dye represented by Formula (1) and the dye represented by Formula (2) have the maximum absorption at a wavelength of 450 nm to 500 nm, in a case where the dye is used in the protective sheet, excellent blue light blocking properties are provided, and since the absorption is sharp and the absorption in the range on the longer wavelength side is extremely low compared with the dye disclosed in JP2015-87690A, in a case where the display image of the display is visually observed via the protective sheet having the coloring agent-containing layer including the aforementioned dye, the color reproducibility of the image became satisfactory. It is considered that the aforementioned dye has physical properties such as light resistance or durability required to be used in the protective sheet, and thus has the sustainability of the effect which is sufficient in practice. The dye represented by Formula (1) and the dye represented by Formula (2) have sharp peak of the maximum absorption wavelength in the absorption spectrum, and the protective sheet is slightly yellow, but the yellow is visually observed, and there is less concern that the color reproducibility of the display image of the display is decreased. For example, this effect is remarkable in a case where the display image is white.

The aforementioned effect increases in a case where the maximum absorption wavelength of the used dye is 450 nm to 500 nm, and the visible light transmittance at the maximum absorption wavelength of the dye is less than 60%.

The present disclosure is not limited to the estimation mechanism at all.

<Content Form and Content of Dye>

At least one dye (hereinafter, also referred to as a specific dye) selected from the group consisting of the dye represented by Formula (1) and the dye represented by Formula (2) is included in the protective sheet of the present disclosure, and two or more kinds thereof may be included.

The form in which the specific dye is contained in the protective sheet is not particularly limited, and the form is not particularly limited as long as the specific dye is contained in any layer of the protective sheet. In view of stably fixing the specific dye to a protective layer, it is preferable that the specific dye is included in a resin layer.

For example, the protective sheet can have a form of including a transparent support, a coloring agent-containing layer which is arranged on at least one surface of the transparent support and which includes at least one dye selected from the group consisting of the dye represented by Formula (1) and the dye represented by Formula (2).

For example, the coloring agent-containing layer can be formed by coating a transparent support with a curable composition containing a dye and curing the curable composition.

That is, in view of the stability and handleability of the obtained protective sheet, one of the preferable aspects of the coloring agent-containing layer is a cured product of a curable composition including at least one dye selected from the group consisting of the dye represented by Formula (1) and the dye represented by Formula (2), a polymerizable compound, and a polymerization initiator.

With respect to the configuration of the protective sheet, as described above, in addition to the aspect of having the transparent support and the coloring agent-containing layer, in a case of the protective sheet having a transparent support, a hard coat layer, and an adhesive layer, the specific dye may be included in at least one of the transparent support, the hard coat layer, or the adhesive layer. For example, an aspect in which the adhesive layer arranged on the transparent support includes the specific dye, and the coloring agent-containing layer has a function of the adhesive layer may be provided.

In a case where the coloring agent-containing layer has the function as the adhesive layer, for example, the coloring agent-containing layer may be a cured product of the curable composition further including the pressure sensitive adhesive in addition to at least one dye selected from the group consisting of the dye represented by Formula (1) and the dye represented by Formula (2), the polymerizable compound, and the polymerization initiator. According to the aforementioned aspect, it is possible to obtain a coloring agent-containing layer having pressure sensitive properties.

Details of the curable composition are provided below.

Without deteriorating the effect of the present embodiment, the specific dye may be included in the transparent support of the protective sheet. The specific dye is caused to be contained in the composition for forming the hard coat layer used in a case where the hard coat layer is provided on the surface of the display, and the hard coat layer containing the specific dye is directly provided on the surface of the display, so as to be used as the protective sheet.

The content of the specific dye in the protective sheet is not particularly limited.

In view of the satisfactory blue light blocking effect and the satisfactory balance between the color reproducibility and visibility of the image, the content of the specific dye in the protective sheet is preferably in the range of 0.005 mmol (milimole)/$m^2$ to 0.1 mmol/$m^2$ and more preferably in the range of 0.01 mmol/$m^2$ to 0.05 mmol/$m^2$.

The content of the dye in the coloring agent-containing layer can be measured in the following method.

That is, after the coloring agent-containing layer of which the area is known is immersed in an organic solvent (tetrahydrofuran or the like), the organic solvent in which the coloring agent-containing layer is dissolved is diluted to a predetermined amount. Here, the expression "being diluted to a predetermined amount" means that the diluted liquid is put into a cell for measurement, and the spectral spectrum is diluted to a measurable magnification. The diluted solution of the obtained organic solvent was subjected to spectroscopic spectrum measurement by using a UV/vis spectrometer, for example, UV/vis spectrometer UV3400 manufactured by Shimadzu Corporation, the absorbance (Abs) at the maximum absorption wavelength λmax is calculated, and the molar concentration of the dye contained in the coloring agent-containing layer can be calculated from the light absorption coefficient of the dye.

The content of the specific dye per unit area can be adjusted by controlling at least one of the content of the specific dye in the curable composition used in the forming of the protective sheet or the film thickness as the cured product after drying.

<Other Colorants>

The protective sheet of the present disclosure may further include a colorant different from at least one dye (that is, the specific dye) selected from the group consisting of the dye represented by Formula (1) and the dye represented by Formula (2).

By including a colorant (hereinafter, also referred to as another colorant) different from the specific dye, the hue, the absorption wavelength, the visible light transmittance, and the like, of the protective sheet can be adjusted.

The other colorant is not particularly limited, as long as the effect is not deteriorated, and the other colorant can be appropriately selected from dyes, pigments, or the like, according to the purpose. The hue of the other colorant can be appropriately selected according to the purpose.

The colorant may be used singly or two or more kinds thereof may be used in the protective sheet.

Examples of the hue of the other colorant include blue, green, purple, and yellow. However, in a case where the colorant having absorption in the visible light range of 500 nm to 600 nm is included in a large amount, the hue of the protective sheet is slightly reddish, and thus in a case where a colorant having absorption in the visible light range of 500 nm to 600 nm is used, the content thereof or the like is carefully adjusted.

Examples of the other colorant include a dye represented by Formula (3).

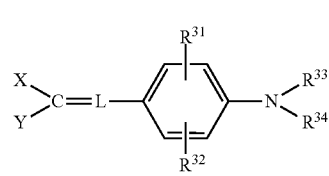

(3)

In Formula (3), X and Y each independently represent a cyano group, a carboxyl group, an alkylcarbonyl group, an arylcarbonyl group, an alkoxycarbonyl group, an aryloxycarbonyl group, a carbamoyl group, a sulfonyl group, or a sulfamoyl group. X and Y are linked to each other to form a ring.

$R^{31}$ and $R^{32}$ each independently represent a hydrogen atom, a halogen atom, an alkyl group, an alkoxy group, a hydroxy group, a carboxyl group, a substituted amino group, a carbamoyl group, a sulfamoyl group, or an alkoxycarbonyl group.

$R^{33}$ and $R^{34}$ each independently represent a hydrogen atom, an alkyl group, an alkenyl group, an aryl group, an acyl group, or a sulfonyl group. $R^{33}$ and $R^{34}$ are linked to each other to form a 5-membered ring or a 6-membered ring.

$R^{31}$ and $R^{33}$, $R^{32}$ and $R^{34}$ are connected to each other, to form a 5-membered ring or a 6-membered ring.

L represents a methine group.

For example, the dye represented by Formula (3) is specifically described in JP1989-207742A (JP-H01-207742A), as the compound represented by Formula (1). The compound specifically disclosed on the fourth line in the lower right column of page 4 and on the first line of the lower right column of page 8 of the patent document can be applied as the dye represented by Formula (3).

In addition to the dye represented by Formula (3), a dye that is not included in the specific dye may be contained in the protective sheet of the present disclosure.

Examples of the dye other than the specific dye include phthalocyanine-based dyes, xanthene-based dyes, triarylmethane-based dyes, methine-based dyes, azo dyes, and anthraquinone dyes disclosed in US2008/0076044A1 as phthalocyanine compound, and dipyrromethene-based dyes disclosed in JP2008-292970A, which are dyes having different structures from the dye represented by Formula (1), and the dye other than the specific dye may or may not have the maximum absorption wavelength in the range of 450 nm to 500 nm.

As the colorant, in addition to the aforementioned specific dyes, a pigment may be used.

Examples of the pigments used as the colorant include perylene, perinone, quinacridone, quinacridone quinone, anthraquinone, antoantron, benzimidazolone, disazo condensation, disazo, azo, indanthrone, phthalocyanine, triarylcarbonium, dioxazine, amino anthraquinone, diketopyrrolopyrrole, indigo, thioindigo, isoindoline, isoindolinone, pyrantron, or isoviolanthrone.

Specific examples thereof include perylene pigments such as pigment red 190, pigment red 224, and pigment violet 29, perinone pigments such as pigment orange 43 and pigment red 194, quinacridone pigments such as pigment violet 19, pigment violet 42, pigment red 122, pigment red 192, pigment red 202, pigment red 207, and pigment red 209, quinacridone quinone pigments such as pigment red 206, pigment orange 48, pigment orange 49, anthraquinone pigments such as pigment yellow 147, anthanthrone pigments such as pigment red 168, benzimidazolone pigments such as pigment brown 25, pigment violet 32, pigment orange 36, pigment yellow 120, pigment yellow 180, pigment yellow 181, pigment orange 62, and pigment red 185, disazo condensed pigments such as pigment yellow 93, pigment yellow 94, pigment yellow 95, pigment yellow 128, pigment yellow 166, pigment orange 34, pigment orange 13, pigment orange 31, pigment red 144, pigment red 166, pigment red 220, pigment red 221, pigment red 242, pigment red 248, pigment red 262, and pigment brown 23, disazo pigments such as pigment yellow 13, pigment yellow 83, and pigment yellow 188, azo pigments such as pigment red 187, pigment red 170, pigment yellow 74, pigment yellow 150, pigment red 48, pigment red 53, pigment orange 64, and pigment red 247, indanthrone pigments such as pigment blue 60, a phthalocyanine pigment such as pigment green 7, pigment green 36, pigment green 37, pigment green 58, pigment blue 16, pigment blue 75, and pigment blue 15, triarylcarbonium pigments such as pigment blue 56 and pigment blue 61, dioxazine pigments such as pigment violet 23 and pigment violet 37, aminoanthraquinone pigments such as pigment red 177, diketopyrrolopyrrole pigments such as pigment red 254, pigment red 255, pigment red 264, pigment red 272, pigment orange 71, and pigment orange 73, thioindigo pigments such as pigment red 88, isoindoline pigments such as pigment yellow 139 and pigment orange 66, isoindolinone pigments such as pigment yellow 109 and pigment orange 61, pyranthrone pigments such as pigment orange 40 and pigment red 216, and isoviolanthrone pigments such as pigment violet 31.

In view of obtaining preferable blue light blocking properties and satisfactory color reproducibility of the image, as the colorant other than the specific dye, phthalocyanine-based dyes, xanthene-based dyes, triarylmethane-based dyes, methine-based dyes, azo dyes, anthraquinone dyes, and dipyrromethene-based dyes are preferably exemplified.

In a case where a pigment is used as a colorant, in view of not deteriorating the visibility of the protective sheet, the average primary particle diameter of the pigment is preferably 200 nm or less, preferably 10 nm to 200 nm, and more preferably 10 nm to 100 nm. In a case where a pigment is used as the colorant, it is preferable that, before a curable composition described below is prepared, the pigment particles are mixed with a dispersing agent, an organic solvent, or the like in advance and are sufficiently dispersed, and a pigment dispersion liquid is prepared and then is caused to be contained in the curable composition.

<Curable Composition>

The curable composition that can be appropriately used in the forming of the protective sheet of the present disclosure is described. The curable composition includes a specific dye, a polymerizable compound, and a polymerization initiator, and may further include other components.

The curable composition is a composition that can be cured by applying energy. Examples of means for applying energy include irradiation with visible light, ultraviolet rays, and electron beams, and heating. In view of versatility and satisfactory curing sensitivity, it is preferable to use ultraviolet ray irradiation means.

(Polymerizable Compound)

A polymerizable compound can be included in the curable composition that can be used for forming of the coloring agent-containing layer. The polymerizable compound can be used without particular limitation, as long as the polymerizable compound is a compound that can obtain a polymerization effect by applying energy. Examples of the polymerizable compound include an addition polymerizable compound having at least one ethylenically unsaturated double bond.

The polymerizable compound is selected from a compound having at least one terminal ethylenically unsaturated bond and preferably a compound having two or more terminal ethylenically unsaturated bonds. Such a compound group is widely known in the relevant industrial field, and in the present embodiment, a well-known polymerizable compound can be used without particular limitation. The compound group may have a chemical form such as a monomer, a prepolymer, that is, a dimer, a trimer, and an oligomer, a mixture thereof, or a (co)polymer thereof.

Examples of the monomer and the (co)polymer thereof include an unsaturated carboxylic acid (for example, acrylic acid, methacrylic acid, itaconic acid, crotonic acid, isocrotonic acid, maleic acid), esters thereof, amide thereof, and a (co)polymer of the aforementioned components, and esters of unsaturated carboxylic acid and an aliphatic polyhydric alcohol compound, amide of unsaturated carboxylic acid and an aliphatic polyvalent amine compound, and a (co) polymer thereof are preferable.

An addition reaction product of unsaturated carboxylic acid ester or amide having a nucleophilic substituent such as a hydroxy group, an amino group, or a mercapto group with a monofunctional or polyfunctional isocyanate compound or an epoxy compound or a dehydration condensation reaction product with monofunctional or polyfunctional carboxylic acid is also preferably used. Unsaturated carboxylic acid ester or amides having an electrophilic substituent such as an isocyanate group or an epoxy group, an addition reaction product with monofunctional or polyfunctional alcohols, amines, or thiols, unsaturated carboxylic acid ester or amide having a releasable substituent such as a halogen group or a tosyloxy group, or a substitution reaction product with monofunctional or polyfunctional alcohol, amine, or thiol is also appropriate. As another example, instead of the unsaturated carboxylic acid, a compound group substituted with unsaturated phosphonic acid or styrene, vinyl ether, or the like may be used.

With respect to the polymerizable compound, details of a usage method such as the structure of the polymerizable compound, either of the single use or the combination use of two or more, or the content of the polymerizable compound can be appropriately set according to the final performance design of the curable composition.

For example, in view of sensitivity, a structure in which a content of the unsaturated groups per molecule is high is preferable, and a bifunctional or higher functional group is preferable in many cases. In view of increasing the strength of the coloring agent-containing layer, a trifunctional or higher functional compound, for example, a hexafunctional acrylate compound can be used.

A method of adjusting both of the sensitivity and the strength by using a compound having a different functional number or another polymerizable group, for example, acrylic acid ester, methacrylic acid ester, a styrene-based compound, and a vinyl ether-based compound in combination is available.

As the polymerizable compound, a commercially available product may be used. Examples of the commercially available product include KYARAD (registered trademark) PET-30 and KYARAD TPA-330 manufactured by Nippon Kayaku Co., Ltd., POLYVEST (registered trademark) 110M manufactured by Evonik Industries AG, and polyfunctional acrylate A-9300 (trade name) manufactured by Shin-Nakamura Chemical Co., Ltd.

The polymerizable compound may be contained singly in the curable composition, or two or more kinds thereof may be used in combination.

The content of the polymerizable compound in the curable composition is not particularly limited. For example, the content of the polymerizable compound is preferably 30 mass % to 99.5 mass %, more preferably 50 mass % to 99 mass %, and even more preferably 60 mass % to 98 mass % with respect to the total solid content in the curable composition.

A preferable aspect in a case where a polymer compound is used as the polymerizable compound is provided below.

Examples of the curable resin that can be used as the polymerizable compound of the polymer include a (meth)acrylic resin, a polyester resin, a urethane resin, or a fluorine-based resin.

The curable resin in the curable composition may be used singly or two or more kinds thereof may be used in combination. In view of the film uniformity, it is preferable to use the curable resin singly.

In view of the strength of the coloring agent-containing layer, it is preferable that the curable resin has a crosslinking structure. The method of forming a crosslinking structure in the curable resin is not particularly limited. Examples thereof include a method of using a polyfunctional (meth)acrylate monomer that can be combined with a reaction group included in the curable resin and a method of introducing a reactive group (for example, a hydroxyl group) into a (meth)acrylic resin as a curable resin and causing the (meth)acrylic resin to react with a crosslinking agent which reacts with the reactive group.

Specific examples of the method of introducing the reactive group into the (meth)acrylic resin include a method of causing a (meth)acrylic resin including a structural unit derived from a (meth)acrylate monomer having a group including one or more kinds of active hydrogen, which is selected from the group consisting of a hydroxyl group, a primary amino group, and a secondary amino group to react with an isocyanate group-containing crosslinking agent, that is, a compound having two or more isocyanate groups in one molecule. In a case where the (meth)acrylate resin having a reactive group is synthesized, it is preferable that three or more polyfunctional (meth)acrylate monomers are used, since the crosslinking density of the obtained coloring agent-containing layer is increased, and the strength is further improved.

As the crosslinking agent, it is possible to appropriately use the well-known crosslinking agent. Examples of the crosslinking agent include AD-TMP and A-9550 (all are trade names) manufactured by Shin-Nakamura Chemical Co., Ltd.

The content of the curable resin in the curable composition is not particularly limited. The content of the curable resin is preferably 30 mass % to 99.5 mass %, more preferably 50 mass % to 99 mass %, and even more preferably 60 mass % to 98 mass % with respect to the total solid content of the curable composition.

The content of the crosslinking agent to be used in combination with the curable resin is preferably 5 parts by mass to 80 parts by mass and more preferably 10 parts by mass to 50 parts by mass with respect to 100 parts by mass of the curable resin.

(Polymerization Initiator)

A polymerization initiator can be included in the curable composition used for forming the coloring agent-containing layer. The polymerization initiator is not particularly limited as long as the polymerization initiator is a compound that can generate initiating species that are required for the polymerization by applying energy, and the polymerization initiator can be appropriately selected from well-known photopolymerization initiators and thermal polymerization initiators.

For example, the photopolymerization initiator is preferably an initiator having photosensitivity to visible rays from the ultraviolet range, may be an initiator which generates some action with the photosensitized sensitizing agent to generate active radicals, or may be an initiator which initiates cationic polymerization according to the type of monomer.

Examples of the photopolymerization initiator include a halogenated hydrocarbon derivative such as a photopolymerization initiator having a triazine skeleton or a photopolymerization initiator having an oxadiazole skeleton, an acylphosphine compound such as acylphosphine oxide, an oxime compound such as hexaarylbiimidazole and an oxime derivative, organic peroxide, a thio compound, a ketone compound, an aromatic onium salt, keto oxime ether, an aminoacetophenone compound, and hydroxyacetophenone. As the aminoacetophenone-based initiator, compounds disclosed in JP2009-191179A, of which the absorption wavelength is adjusted for a long wave light source of 365 nm, 405 nm, or the like, can also be used.

For example, an aminoacetophenone-based initiator disclosed in JP1998-291969A (JP10-291969A) and an acylphosphine oxide-based initiator disclosed in JP4225898B can be used.

As the photopolymerization initiator, a synthesized product may be used, or a commercially available product may be used. As the commercially available product used in the present embodiment, examples of the hydroxyacetophenone-based initiator include IRGACURE (registered trademark)-184, DAROCUR (registered trademark)-1173, IRGACURE-500, IRGACURE-2959, and IRGACURE-127 (trade name: all are manufactured by BASF SE).

Examples of the aminoacetophenone-based initiator include IRGACURE-907, IRGACURE-369, and IRGACURE-379 (trade name: all are manufactured by BASF SE).

Examples of the acylphosphine-based initiator include IRGACURE-819 and DAROCUR-TPO (trade name: all are manufactured by BASF SE).

As the photopolymerization initiator, an oxime-based initiator is more preferable. Specific examples of the oxime-based compound include compounds disclosed in JP2001-233842A, compounds disclosed in JP2000-80068A, compounds disclosed in JP2006-342166A, and compounds disclosed in paragraphs [0073] to [0075] of JP2016-6475A.

Examples of the commercially available product of the oxime ester compound that can be used as the photopolymerization initiator include IRGACURE-OXE01 (manufactured by BASF SE) and IRGACURE-OXE02 (manufactured by BASF SE).

Examples of the cation polymerization initiator which is an initiator that initiates cation polymerization include well-known compounds such as a photoinitiator for photo cationic polymerization, a photo-decoloring agent based on coloring agents, a photochromic agent, and known acid generators that are used in a micro resist or the like, and a mixture thereof.

Examples of the cation polymerization initiator that can be used in the curable composition used for forming the coloring agent-containing layer include an onium compound, an organic halogen compound, and a disulfone compound. Specific examples of the organic halogen compound and the disulfone compound include compounds as described for the compound generating radicals.

Examples of the onium compound include a diazonium salt, an ammonium salt, an iminium salt, a phosphonium salt, an iodonium salt, a sulfonium salt, an arsonium salt, and a selenonium salt, and examples thereof include the compounds disclosed in paragraphs [0058] to [0059] of JP2002-29162A.

The polymerization initiator may be used in the curable composition singly, and two or more kinds thereof may be used in combination.

The content of the polymerization initiator is preferably 0.1 mass % to 20 mass %, more preferably 0.3 mass % to 15 mass %, and even more preferably 0.4 mass % to 10 mass % with respect to the total solid content of the curable composition.

(Pressure Sensitive Adhesive)

The coloring agent-containing layer may contain a pressure sensitive adhesive.

In a case where the coloring agent-containing layer contains a pressure sensitive adhesive, by causing the curable composition for forming the coloring agent-containing layer to contain the pressure sensitive adhesive, it is possible to apply the pressure sensitive properties to the obtained coloring agent-containing layer. In a case where the coloring agent-containing layer includes the pressure sensitive adhesive, the coloring agent-containing layer can function as the pressure sensitive layer.

The pressure sensitive adhesive is not particularly limited, as long as the pressure sensitive adhesive can apply required pressure sensitive properties to the formed coloring agent-containing layer, and well-known pressure sensitive adhesives can be used.

Examples of the pressure sensitive adhesive include an acrylic pressure sensitive adhesive, a rubber-based pressure sensitive adhesive, and a silicone-based pressure sensitive adhesive. The acrylic pressure sensitive adhesive is a pressure sensitive adhesive including a polymer ((meth)acrylic polymer) of a (meth)acrylic monomer. The acrylic pressure sensitive adhesive may contain other components, for example, a viscosity imparting agent or a rubber component, as long as the aforementioned polymer is a major component, that is, the content of the aforementioned polymer is 50 mass % or more with respect to the total amount of the pressure sensitive adhesive.

As the pressure sensitive adhesive, for example, acrylic pressure sensitive adhesives, UV-curable pressure sensitive adhesives, and silicone pressure sensitive adhesives disclosed in Chapters 2 of "Characterization evaluation of release paper, release film, and adhesive tape, and control technique thereof", 2004, Information Mechanism are appropriately used in the present embodiment.

The (meth)acrylate monomer included in the pressure sensitive adhesive is preferably a (meth)acrylate monomer having a hydrocarbon group having 4 or more carbon atoms, and specific examples thereof include 2-ethylhexyl (meth)acrylate, n-octyl (meth)acrylate, isooctyl (meth)acrylate, n-nonyl (meth)acrylate, isononyl (meth)acrylate, n-decyl (meth)acrylate, isodecyl (meth)acrylate, n-dodecyl (meth)acrylate, n-tridecyl (meth)acrylate, n-tetradecyl (meth)acrylate, n-hexadecyl (meth)acrylate, stearyl (meth)acrylate, isobornyl (meth)acrylate, dicyclopentenyl (meth)acrylate, dicyclopentanyl (meth)acrylate, and dicyclopentenyloxyethyl (meth)acrylate.

The (meth)acrylic polymer that can be used in the pressure sensitive adhesive may have a crosslinking structure. The method of forming the crosslinking structure is not particularly limited, and examples thereof include a method of using a difunctional (meth)acrylate monomer and a method of introducing a reactive group such as a hydroxy group into the (meth)acrylic polymer and causing the (meth)acrylic polymer to react with the crosslinking agent that reacts with the introduced reactive group.

Specific examples of the method of introducing the reactive group such as the hydroxy group into the (meth)acrylic polymer and causing the (meth)acrylic polymer to react with the crosslinking agent that reacts with the introduced reactive group include a method of causing the (meth)acrylic polymer having a repeating unit derived from a (meth)acrylate monomer having a group having one or more active hydrogen selected from the group consisting of a hydroxy group, a primary amino group, and a secondary amino group and the aforementioned isocyanate-based crosslinking agent to react with each other so as to manufacture the coloring agent-containing layer having pressure sensitive properties.

The (meth)acrylate monomer that is used together with the pressure sensitive adhesive is preferably a monofunctional (meth)acrylate monomer including one (meth)acryloyl group.

In view of sufficiently obtaining the effect of exhibiting the pressure sensitive properties, the content in a case where the pressure sensitive adhesive is contained in the curable composition is preferably 10 mass % to 50 mass % and more preferably 15 mass % to 40 mass % with respect to the total solid content included in the curable composition.

In a case where the curable composition includes the pressure sensitive adhesive, the viscosity imparting agent may be further included.

As the viscosity imparting agent, viscosity imparting agents well known in the field of patch or patch preparation can be appropriately selected to be used.

Examples of the viscosity imparting agent include a petroleum resin such as an aromatic petroleum resin, an aliphatic petroleum resin, an aliphatic/aromatic hybrid petroleum resin, and a resin by C9 fraction; a terpene-based resin such as an a pinene resin, a P pinene resin, a resin obtained by copolymerizing a mixture of a pinene/β pinene/dipentene, a terpene phenol copolymer, a hydrogenated terpene phenolic resin, an aromatic modified hydrogenated terpene resin, an abietic acid ester-based resin; a rosin-based resin such as a partially hydrogenated gum rosin resin, an erythritol modified wood rosin resin, a tall oil rosin resin, a wood rosin resin, gum rosin, a rosin modified maleic acid resin, polymerized rosin, rosin phenol, and rosin ester, and a coumarone indene resin such as a coumarone indene styrene copolymer.

The content of the viscosity imparting agent in a case where a viscosity imparting agent is included in the curable composition is preferably 10 mass % to 200 mass % and more preferably 20 mass % to 100 mass % with respect to the total mass of the pressure sensitive adhesive included in the curable composition.

In a case where the curable composition includes the pressure sensitive adhesive, a rubber component as a softening agent can be included.

Examples of the rubber component include polyolefin or modified polyolefin. Examples of the rubber component include natural rubber, polyisobutylene, polybutadiene such as modified liquid polybutadiene, 1,4-butadiene, 1,2-butadiene, and a polymer of the copolymer mixture, hydrogenated polyisoprene, hydrogenated polybutadiene, polyisoprene, polybutene, a styrene butadiene copolymer, or a copolymer or a mixture including two or more components randomly selected from these groups.

The content of the rubber component in a case where a rubber component is included in the curable composition as a softener is preferably 10 mass % to 200 mass % and more preferably 20 mass % to 100 mass % with respect to the total mass of the pressure sensitive adhesive included in the curable composition.

(Other Components)

In addition to the aforementioned polymerizable compound and the polymerization initiator, and the pressure sensitive adhesive, the viscosity imparting agent, and the rubber components further included as desired, various components can be included in the curable composition for forming the coloring agent-containing layer depending on the purpose. The components other than the aforementioned components that can be included in the curable composition may be referred to as "other components".

Examples of other components include a solvent, a filler, a binder resin not having curability, a surfactant such as a nonionic surfactant, a cationic surfactant, and an anionic surfactant, an adhesion promoter, an antioxidant, an ultraviolet absorbing agent, and an aggregation inhibitor. A sensitizing agent for improving the sensitivity of the photopolymerization initiator, a light stabilizer contributing to the stability of the photopolymerization initiator, a thermal polymerization inhibitor, and the like may be contained.

(Ultraviolet Absorbing Agent)

The curable composition may contain an ultraviolet absorbing agent. By causing the curable composition to contain the ultraviolet absorbing agent, it is possible to form a coloring agent-containing layer in which transmission of ultraviolet rays is further suppressed, in addition to the blue light blocking properties.

Examples of the ultraviolet absorbing agent include an ultraviolet absorbing compound selected from benzotriazole-based, triazine-based, benzophenone-based, merocyanine-based, cyanine-based, dibenzoylmethane-based, cinnamic acid-based, acrylate-based, benzoic acid ester-based, oxalic acid diamide-based, formamidine-based, benzoxazinone-based, benzoxazole-based, and benzodithiol-based compounds. Examples of the ultraviolet absorbing agent that can be used in the present embodiment are disclosed in pages 28 to 38 of Fine chemical, May 2004, "New Development of functional additives for polymers" (Toray Research Center, 1999), published by Research Division, Toray Research Center, Inc., pages 96 to 140 of "Development and environmental measures of polymer additives" supervised by Yoshikazu Oshika (CMC Publishing Co., Ltd., 2003), and pages 54 to 64 of "Degradation and discoloration mechanism of polymer and stabilization technologies thereof—Collection of know-how" (Japan Electronics and Information Technology Industries Association, 2006) published by Japan Electronics and Information Technology Industries Association, and the ultraviolet absorbing agent can be appropriately selected from the compounds disclosed in the aforementioned documents depending on the purposes.

Examples of the ultraviolet absorbing agent that can be used in the curable composition according to the present disclosure include the following compounds.

Examples of the benzoxazole-based compound include a compound represented by Formula (II) disclosed in JP4311869B as a fluorescent whitening agent.

Examples of the benzoxazinone-based compound include compounds disclosed in JP5591453B and JP5250289B.

Examples of the merocyanine-based compound include compounds disclosed in JP2011-184414A.

Examples of the benzodithiole-based compound include compounds disclosed in JP5450994B and JP5364311B.

Specific examples of the benzoxazinone-based compound include UV-1 to UV-3 having the following structures.

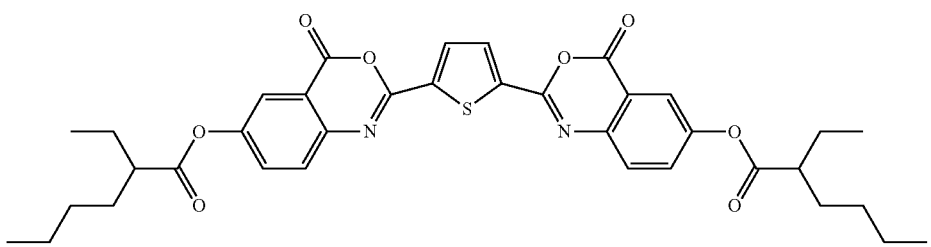

UV-1

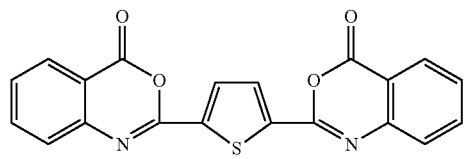

UV-2

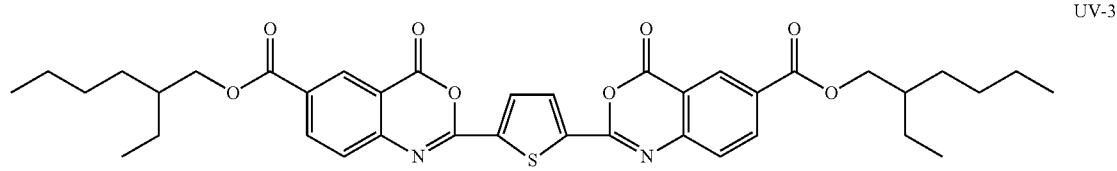

UV-3

Specific examples of the merocyanine-based compound include UV-4 and UV-5 having the following structures.

UV-4

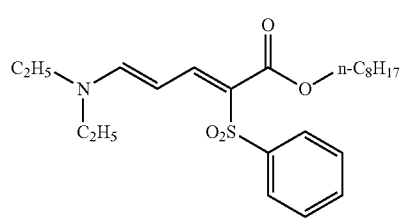

UV-5

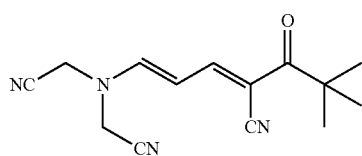

Specific examples of the benzoxazole-based compound include UV-6 and UV-7 having the following structures.

UV-6

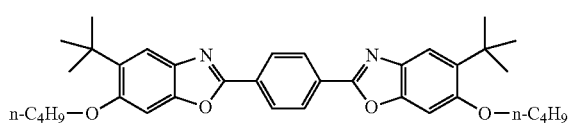

UV-7

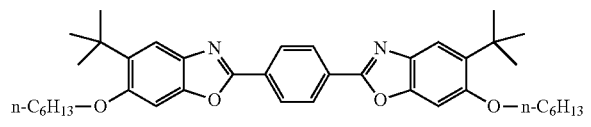

Specific examples of the benzodithiole-based compound include UV-8 and UV-9 having the following structures.

UV-8

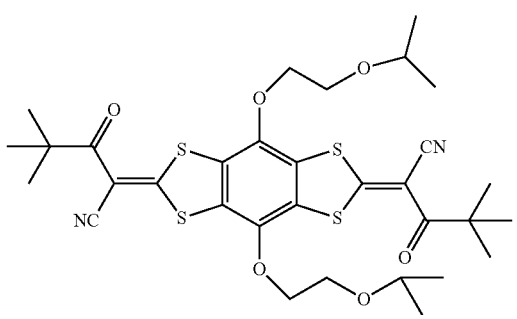

UV-9

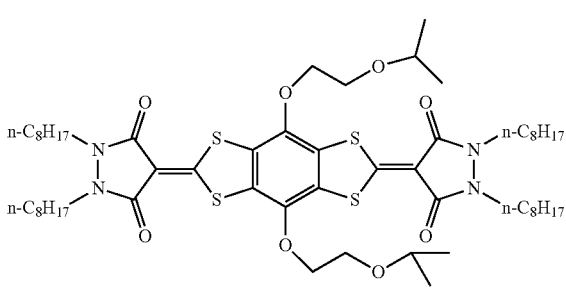

In a case where the curable composition contains an ultraviolet absorbing agent, the ultraviolet absorbing agent may be included singly or two or more kinds thereof may be included.

The content in a case where the curable composition contains the ultraviolet absorbing agent is appropriately determined according to the ultraviolet absorbing agent. Generally, the content can be 0.01 mass % to 20 mass % with respect to the total amount of the curable composition.

(Solvent)

In order to prepare the curable composition as a coating liquid, for example, a solvent may be included.

As a solvent, an organic solvent is used. The solvent is not particularly limited as long as the solvent satisfies the solubility of each component included in the curable composition and the coatability after the curable composition is prepared, and the solvent is preferably selected considering the dye, the dye, the solubility or dispersibility of the polymerizable compound, the state of the coated surface of the coating liquid, and ease of handling.

Examples of the organic solvent include ester, ether, ketone, and aromatic hydrocarbon.

Examples of ester include ethyl acetate, n-butyl acetate, isobutyl acetate, amyl formate, isoamyl acetate, isobutyl acetate, butyl propionate, isopropyl butyrate, ethyl butyrate, butyl butyrate, methyl lactate, ethyl lactate, oxyacetic acid alkyl esters (for example, methyl oxyacetate, ethyl oxyacetate, and butyl oxyacetate (specifically, methyl methoxyacetate, ethyl methoxyacetate, butyl methoxyacetate, methyl ethoxyacetate, and ethyl ethoxyacetate are exemplified)), 3-oxypropionic acid alkyl esters (for example, methyl 3-oxypropionate or ethyl 3-oxypropionate (specifically, methyl 3-methoxypropionate, ethyl 3-methoxypropionate, methyl 3-ethoxypropionate, and ethyl 3-ethoxypropionate are exemplified)), 2-oxypropionic acid alkyl esters (for example, methyl 2-oxypropionate, ethyl 2-oxypropionate, and propyl 2-oxypropionate (specifically, methyl 2-methoxypropionate, ethyl 2-methoxypropionate, propyl 2-methoxypropionate, methyl 2-ethoxypropionate, and ethyl 2-ethoxypropionate)), methyl 2-oxy-2-methylpropionate, ethyl 2-oxy-2-methylpropionate (specifically, methyl 2-methoxy-2-methylpropionate and ethyl 2-ethoxy-2-methylpropionate are exemplified), methyl pyruvate, ethyl pyruvate, propyl pyruvate, methyl acetoacetate, ethyl acetoacetate, methyl 2-oxobutanoate, ethyl 2-oxobutanoate, cyclohexyl acetate, and 1-methyl-2-methoxyethyl propionate.

Examples of ether include diethylene glycol dimethyl ether, tetrahydrofuran, ethylene glycol monomethyl ether, ethylene glycol monoethyl ether, methyl cellosolve acetate, ethyl cellosolve acetate, diethylene glycol monomethyl ether, diethylene glycol monoethyl ether, diethylene glycol monobutyl ether, propylene glycol monomethyl ether, propylene glycol monomethyl ether acetate (hereinafter, also referred to as "PEGMEA"), diethylene glycol monoethyl ether acetate (hereinafter, also referred to as "ethyl carbitol acetate"), diethylene glycol monobutyl ether acetate (hereinafter, also referred to as "butyl carbitol acetate"), propylene glycol monoethyl ether acetate, and propylene glycol monopropyl ether acetate.

Examples of ketone include methyl ethyl ketone, cyclohexanone, 2-heptanone, and 3-heptanone.

Preferable examples of the aromatic hydrocarbon include toluene and xylene.

These organic solvents may be used singly in the curable composition, or two or more kinds thereof may be used in combination, in view of solubility of each component, improvement of the state of the coated surface, and the like.

In a case where two or more kinds thereof are used in combination, it is preferable to include two or more kinds selected from the group consisting of methyl 3-ethoxypropionate, ethyl 3-ethoxypropionate, ethyl cellosolve acetate, ethyl lactate, diethylene glycol dimethyl ether, butyl acetate, methyl 3-methoxypropionate, 2-heptanone, cyclohexanone, ethyl carbitol acetate, butyl carbitol acetate, propylene glycol methyl ether, and propylene glycol methyl ether acetate.

The content of the organic solvent in the curable composition is preferably an amount in which the total solid content concentration in the composition is 10 mass % to 80 mass % and more preferably an amount in which the total solid content concentration is 15 mass % to 60 mass %.

<Forming of Coloring Agent-Containing Layer>

A coloring agent-containing layer can be formed by dissolving each of the aforementioned components in an organic solvent which is a solvent to prepare a curable composition coating liquid, applying the curable composition coating liquid to a desired portion, and curing the curable composition coating liquid. That is, the coloring agent-containing layer in the protective sheet of the present disclosure is preferably a cured product of the curable composition at least including a specific dye, a polymerizable compound, and a photopolymerization initiator.

The thickness of the coloring agent-containing layer can be randomly selected in the range of achieving a preferable content of the specific dye and the visible light transmittance.

The thickness of the coloring agent-containing layer is not particularly limited, but the thickness, for example, may be in the range of 5 m to 2,500 m. The thickness of the coloring agent-containing layer is preferably 20 m to 500 m. In a case where the thickness of the coloring agent-containing layer is in the aforementioned range, desired blue light blocking properties and desired visible light transmittance are easily obtained, and the coloring agent-containing layer can be easily handled. A preferable thickness in a case of the coloring agent-containing layer that also functions as the pressure sensitive layer including the pressure sensitive adhesive is also the same.

It is preferable that the coloring agent-containing layer is optically transparent. The expression "the coloring agent-containing layer is optically transparent" means that the total light transmittance is 75% or more, preferably 80% or more, and more preferably 85% or more.

For example, in the coloring agent-containing layer, for example, even in a case where the visible light transmittance at the maximum absorption wavelength is 50%, the light transmittance in the wavelength range other than the maximum absorption wavelength is higher, and thus the coloring agent-containing layer can be caused to be optically transparent, that is, the total light transmittance in the coloring agent-containing layer can be caused in the preferable range.

<Curing of Coloring Agent-Containing Layer>

After a curable composition coating liquid layer is formed by coating the aforementioned transparent support with the curable composition coating liquid for forming the coloring agent-containing layer, the curable composition coating liquid layer is cured by applying energy so as to form the coloring agent-containing layer. As the energy application, light irradiation, particularly, ultraviolet irradiation can be preferably applied.

For example, before light irradiation is performed on the curable composition coating liquid layer, it is preferable that the solvent included in the curable composition coating liquid in advance is dried, such that the amount of the solvent is decreased, in view of the improvement of the curability.

In a case where the drying is performed, well-known methods such as a method of blowing warm air, a method of causing the curable composition coating liquid layer to pass through a drying zone controlled at a predetermined temperature, and a method of drying the solvent with a heater provided on a transport roll can be exemplified.

In the case where light irradiation is performed as energy application, for example, light irradiation can be performed by using an ultraviolet lamp.

The light irradiation amount is preferably in the range of 10 mJ/cm$^2$ to 1,000 mJ/cm$^2$. By the irradiation with ultraviolet light in the aforementioned irradiation amount, curing of the coloring agent-containing layer is suitably performed.

For the purpose of inhibiting curing inhibition caused by oxygen and further promoting the curing of the surface on the coloring agent-containing layer in a case where ultraviolet irradiation is performed, the ultraviolet irradiation area (hereinafter, also referred to as a curing zone) is purged with inert gas such as nitrogen gas, so as to decrease the oxygen concentration. The oxygen concentration in a case where the oxygen concentration of the curing zone is caused to decrease is preferably 0.01% to 5%.

For the purpose of promoting the curing reaction of the curable composition, the temperature of the curing zone can be increased. In view of promoting the curing reaction, the temperature in the curing zone is preferably 25° C. to 100° C., more preferably 30° C. to 80° C., and even more preferably 40° C. to 70° C.

In a case where the curable composition contains the pressure sensitive adhesive, the curing condition can be set as the conditions described above.

<Configuration of Protective Sheet>

As long as the protective sheet includes the aforementioned specific dye, the configuration thereof is not particularly limited.

As described in the section of the content form of the dye, as one preferable aspect of the protective sheet, a form of having a transparent support, a coloring agent-containing layer that is arranged on at least one surface of the transparent support and that includes at least one dye selected from the group consisting of the dye represented by Formula (1) and the dye represented by Formula (2) can be exemplified.

(Transparent Support)

A preferable example of the transparent support in a case where the protective sheet has the support includes a general resin film.

Examples of the resin forming a resin film that is used in the transparent support include polyester such as polyethylene terephthalate (PET), polyethylene naphthalate (PEN), polybutylene terephthalate (PBT), and polycyclohexane dimethylene terephthalate (PCT), polypropylene (PP), polyethylene (PE), polyvinyl chloride (PVA), and tricellulose acetate (TAC). Among these, in view of versatility, PET is preferable.

The transparent support can be obtained by forming the aforementioned resin into a film shape by information. A commercially available resin film can be used.

The thickness of the transparent support can be appropriately selected depending on purposes of the use, such as the application, the size, and the strength of an image display device to which the protective sheet is applied. Generally, the thickness is preferably 5 m to 2,500 m and more preferably 20 m to 500 m.

The transparent support means an optically transparent support. In the present specification, the expression "optically transparent" means that the total light transmittance of the support is 85% or more. The total light transmittance of the transparent support is preferably 90% or more and more preferably 95% or more.

The total light transmittance of the transparent support can be measured by the following method.

The total light transmittance can be measured by spectroscopically measuring the transparent support by using a UV/vis spectrometer, for example, a UV/vis spectrometer UV3400 manufactured by Shimadzu Corporation.

The coloring agent-containing layer can be formed on the transparent support by coating the transparent support with the aforementioned curable composition coating liquid and curing the aforementioned curable composition coating liquid.

Without deteriorating the effect, other layers such as an easy adhesion layer may be provided between the transparent support and the coloring agent-containing layer.

In a case where the curable composition coating liquid for forming the coloring agent-containing layer contains the pressure sensitive adhesive, the coloring agent-containing layer formed on the transparent support also functions as the pressure sensitive layer. Therefore, in order to closely attach the protective sheet to the display, the coloring agent-containing layer side that also functions as the pressure sensitive layer is caused to be directly in contact with the surface of the display so as to be closely attached, such that the protective sheet can be provided for display.

(Adhesive Layer and Pressure Sensitive Layer)

In a case where the coloring agent-containing layer does not include the pressure sensitive adhesive, an adhesive layer or a pressure sensitive layer may be further provided on the side opposite to the transparent support of the coloring agent-containing layer.

The kinds of the adhesive and the pressure sensitive adhesive used in the adhesive layer or the pressure sensitive layer are not particularly limited. Examples of the pressure sensitive adhesive include pressure sensitive adhesives that can be contained in the aforementioned curable composition in the same manner.

Examples of the adhesive include a urethane resin adhesive, a polyester adhesive, an acrylic resin adhesive, an ethylene vinyl acetate resin adhesive, a polyvinyl alcohol adhesive, a polyamide adhesive, and a silicone adhesive. In view of increasing the bonding strength, as the adhesive, a urethane resin adhesive or a silicone adhesive is preferable.

As the adhesive, a commercially available product can be used, and examples of the commercially available product include a urethane resin-based adhesive (LIS-073-50U: trade name) manufactured by Toyo Ink Co., Ltd., and the adhesive is preferably used in combination with a curing agent (CR-001: trade name, manufactured by Toyo Ink Co., Ltd.).

The thickness of the adhesive layer or the pressure sensitive layer in a case where the adhesive layer or the pressure sensitive layer is provided in the protective sheet is preferably in the range of 5 μm to 100 μm in view of compatibility between the pressure sensitive force and the handleability.

(Hard Coat Layer)

In view of improvement of the scratch resistance, the protective sheet of the present disclosure can further have a hard coat layer on the coloring agent-containing layer arranged on the transparent support.

The hard coat layer is preferably provided on the outermost surface of the protective sheet arranged in the image display device, and the scratch resistance of the protective sheet becomes satisfactory by providing the hard coat layer on the outermost surface.

Hereinafter, a hard coat layer that a protective sheet can have is described.

The hard coat layer may be formed by any of a wet coating method and a dry coating method (vacuum film formation), but is preferably formed by a wet coating method in which the productivity is excellent.

As the hard coat layer, for example, hard coat layers disclosed in JP2013-45045A, JP2013-43352A, JP2012-232459A, JP2012-128157A, JP2011-131409A, JP2011-131404A, JP2011-126162A, JP2011-75705A, JP2009-286981A, JP2009-263567A, JP2009-75248A, JP2007-164206A, JP2006-96811A, JP2004-75970A, JP2002-156505A, JP2001-272503A, WO12/018087A, WO12/098967A, WO12/086659A, and WO11/105594A can be used.

The thickness in a case where the hard coat layer is provided in the protective sheet of the present disclosure is preferably in the range of 5 m to 100 m, in view of satisfactory scratch resistance.

[Image Display Device]

The image display device of the present disclosure is an image display device including the aforementioned protective sheet of the present disclosure.

That is, the image display device includes an image display element and the protective sheet according to the present embodiment, and the protective sheet is arranged on an image display portion (for example, a display) that displays an image, that is, the side of the image display portion visually observed by the user.

Examples of the image display device include an image display device such as a liquid crystal display (LCD), a plasma display panel, an electroluminescent display, a cathode ray display device.

The image display device also includes not only a large-area image display device but also an aspect having various displays such as a smartphone and a tablet terminal on which the touch panel described below is mounted.

Examples of the liquid crystal display device include a Twisted Nematic (TN) type, a Super-Twisted Nematic (STN) type, a Triple Super Twisted Nematic (TSTN) type, a multi-domain type, a Vertical Alignment (VA) type, and an Inplane Switching (IPS) Optically Compensated Bend (OCB) type.

The image display device is preferably a liquid crystal display device in which the liquid crystal cell and the protective sheet according to the present embodiment which is arranged on at least one surface of the liquid crystal cell are arranged on the outermost surface. In this case, the image display element is a liquid crystal display element.

In the image display device of the present disclosure, it is preferable that the image display element is an organic electroluminescence display element.

(Touch Panel)

An image display device having a display including a touch panel is included in the image display device to which the protective sheet of the present disclosure can be applied. The touch panel is not particularly limited and can be appropriately selected depending on the purpose. Examples thereof include a surface type capacitive touch panel, a projection type capacitive touch panel, and a resistive film type touch panel.

The touch panel includes a so-called touch sensor and a touch pad. The layer configuration of the touch panel sensor electrode portion in the touch panel may be any one of a laminate method in which two transparent electrodes are laminated, a method in which transparent electrodes are provided on both sides of one substrate, a one-side jumper or through-hole method, and a one-side lamination method. In the projection type capacitive touch panel, an alternating current (AC) drive is preferable to a direct current (DC) drive, and a drive method with less voltage application time to an electrode is more preferable.

[Spectacle Lens]

The spectacle lens of the present disclosure includes at least one dye (that is, a specific dye) selected from the group consisting of the dye represented by Formula (1) and the dye represented by Formula (2).

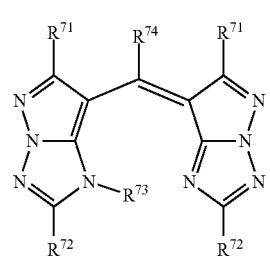

(1)

In Formula (1), $R^{71}$, $R^{72}$, $R^{73}$, and $R^{74}$ each independently represent a hydrogen atom, an alkyl group, an alkoxy group, an alkoxycarbonyl group, a carbamoyl group, a sulfamoyl group, a cyano group, an aryl group, or a heteroaryl group.

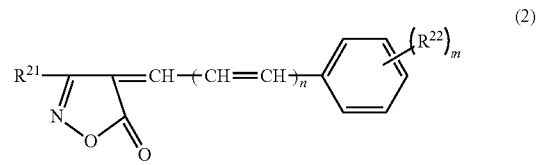

(2)

In Formula (2), $R^{2'}$ represents an alkyl group, an aryl group, a heterocyclic group, a carboxyl group, an alkoxycarbonyl group, an aryloxycarbonyl group, a carbamoyl group, or a cyano group. $R^{22}$ represents a hydrogen atom, a halogen atom, an alkyl group, an alkoxy group, a hydroxy group, an amino group, a carbamoyl group, a sulfamoyl group, or an alkoxycarbonyl group. $R^{22}$ may form a 5-membered or 6-membered fused ring together with a benzene ring to which $R^{22}$ is bonded.

n represents 0 or 1, and m represents an integer of 1 to 5. Here, at least one of $R^{21}$ or $R^{22}$ is an alkyl group having 4 or more carbon atoms. In a case where m is 2 to 5, a plurality of $R^{22}$'s may be identical to or different from each other.

With respect to the aforementioned specific dye, in the range in which the maximum absorption wavelength is 450 nm to 500 nm, the visible light transmittance at the maximum absorption wavelength is preferably less than 60%.

By causing the spectacle lens of the present disclosure to contain the aforementioned specific dye, at least the blue light in the visible light range can be blocked, and the color reproducibility of images, articles, or the like, which are the object of visual observation becomes satisfactory.

The specific dye included in the spectacle lens is the same as the specific dye included in the aforementioned protective sheet, and preferable examples thereof are also the same.

<Content Form and Content of Dye>

The aforementioned specific dye may be included singly, or two or more kinds thereof may be included in combination in the spectacle lens of the present disclosure.

The form in which the specific dye is contained in the spectacle lens is not particularly limited, and examples thereof include an aspect in which a coloring agent-containing layer including the specific dye is provided on at least one surface of the transparent lens which is a lens substrate and an aspect in which the specific dye is included at least one portion of the transparent lens.

One example of the content form of the dye includes an aspect having a transparent lens which is a lens substrate and a coloring agent-containing layer that is arranged on at least one surface of the transparent lens and that includes the specific dye.

The coloring agent-containing layer is preferably a cured product of the curable composition including the specific dye, the polymerizable compound, and the polymerization initiator.

In a case where the spectacle lens of the present disclosure has a form of having a coloring agent-containing layer on at least one surface of the transparent lens, the transparent lens to be used may be a glass lens or a resin lens.

It is preferable that the coloring agent-containing layer is a sol-gel film in view of more satisfactory strength, stability, and the like of the coloring agent-containing layer.

The sol-gel film refers to a sol-gel cured product obtained by hydrolyzing and polycondensing an alkoxide compound of an element selected from the group consisting of silicon (Si), titanium (Ti), zirconium (Zr), and aluminum (Al). The sol-gel film has satisfactory adhesiveness to a transparent plastic lens which is a lens substrate, the dye can be stably maintained, and the film hardness is satisfactory. The sol-gel film using the alkoxide compound of silicon as a raw material has an advantage that hydrophobicity on the surface is excellent and thus contamination hardly occurs.

As the sol-gel film that can be applied to the coloring agent-containing layer, for example, by causing the specific dye to be contained instead of conductive materials disclosed in paragraphs [0042] to [0054] of JP2013-225461A and JP2013-225461A, it is possible to form a sol-gel film which is an appropriate coloring agent-containing layer.

Examples of another preferable form that contains the specific dye include a form in which the transparent lens includes the specific dye.

Since the specific dye can be contained homogeneously and stably, the specific dye is preferably included in the transparent lens which is the lens substrate.

Examples of the form in which the transparent lens includes the specific dye include an aspect in which the specific dye is contained in a material constituting the transparent lens and an aspect in which the spectacle lens is stained with the specific dye so as to cause the specific dye to be contained in the spectacle lens.

Examples of the form in which the transparent lens includes the specific dye include a form in which the specific dye is contained in a material constituting the transparent lens, for example, a resin and a form in which the spectacle lens is stained with the specific dye and the specific dye is contained in the spectacle lens.

In a case where the transparent lens is stained, at least a portion of the transparent lens may be stained with the specific dye. For example, a form in which the entire transparent lens is stained or a form in which the surface and only the vicinity of the surface of the transparent lens are stained with the dye is possible.

<Resin for Spectacle Lens>

The resin for the spectacle lens is selected from a resin having a high refractive index. The resin may be a thermoplastic resin or a thermosetting resin as long as the resin satisfies the physical properties such as transparency, a refractive index, workability, and strength after curing, required for the spectacle lens.

Generally, the refractive index of the resin can be increased by introducing a halogen atom, an aromatic ring, a sulfur atom, or the like other than fluorine into the resin material.

Examples of the thermoplastic resin that can be used for forming the spectacle lens include one or more kinds selected from polycarbonate; an acrylic resin such as polymethyl methacrylate (PMMA); and the like.

As the thermoplastic resin for the spectacle lens, a commercially product compound may be used. Examples of the commercially available product include a polycarbonate resin composition (CALIBRE 200-13: trade name, Sumitomo Dow Limited) and a diethylene glycol bisallyl carbonate resin (CR-39: trade name, manufactured by PPG Industries, Inc.).

In a case where the spectacle lens is manufactured by using the thermoplastic resin, a resin composition including a raw material resin is formed into a pellet shape by using a melt extruder and a well-known forming method such as an injection molding method is applied by using the obtained pellet-shaped resin, so as to manufacture the spectacle lens.

In the case where the specific dye is caused to be contained in the spectacle lens, the raw material resin, the specific dye, and an additive such as an ultraviolet absorbing agent, which can be contained if desired, are introduced into a melt extruder and melt-mixed to obtain a pellet-shaped resin composition including the specific dye, and a lens is formed by using the obtained pellet-shaped resin composition, so as to obtain a spectacle lens including the specific dye.

In a case where a transparent spectacle lens is manufactured and is stained with the specific dye, in a case where the aforementioned resin composition is prepared, a resin composition not containing the specific dye is prepared, a transparent spectacle lens not containing the specific dye is manufactured by using this resin composition, and the obtained transparent lens is immersed in a coloring tank containing a specific dye and stained, so as to obtain a spectacle lens including the specific dye.

Examples of the thermosetting resin that can be used for forming the spectacle lens include one or more kinds selected from a urethane-based resin, an allyl-based resin, and an epithio-based resin. More specifically, examples of the precursor monomer of the resin include bis(2,3-epithiopropyl) disulfide, bis(2-mercaptoethyl) sulfide, and a thiourethane resin monomer, and a thermosetting resin that can be obtained by using these precursor monomers can be used for the forming of the spectacle lenses.

In the case of manufacturing a spectacle lens using a thermosetting resin, generally, a resin composition containing a monomer, which is a precursor of the resin, and a polymerization initiator or a crosslinking agent is prepared, the obtained resin composition is charged in a mold (forming die) and heated to be cured, so as to obtain a spectacle lens.

In a case where the specific dye is caused to be contained in the spectacle lens, a resin precursor monomer that becomes a raw material, a specific dye, a polymerization initiator or a crosslinking agent, and an additive such as an ultraviolet absorbing agent that can be included if desired are mixed, a resin composition including the specific dye is obtained, the obtained resin composition is charged into a mold and heated to be cured, so as to obtain a spectacle lens including the specific dye.

In a case where the transparent spectacle lens is manufactured and stained with the specific dye, in a case where the aforementioned resin composition is prepared, the resin composition not containing the specific dye is prepared, the obtained resin composition is charged into a mold and heated to be cured, a transparent spectacle lens not containing the specific dye is manufactured, and the obtained transparent lens is immersed in a coloring tank including the specific dye to be stained, so as to obtain a spectacle lens including the specific dye.

As a raw material of the thermosetting resin for the spectacle lens, a commercially available product may be used. Examples of commercially available products include thiourethane resin monomers (MR-7, MR-8, MR-10, and MR-174: above are trade names, Mitsui Chemicals, Inc.).

[Spectacles]

The spectacles of the present disclosure include a spectacle lens of the aforementioned the present disclosure.

That is, the spectacles of the present disclosure have a configuration in which the aforementioned spectacle lens of the present disclosure is mounted on an appropriate spectacle frame.

Since the spectacles of the present disclosure have satisfactory blue light blocking properties, the reduction of the fatigue of the eye caused in a case where a work of viewing the display of the image display device or the like is performed for a long period of time can be expected.

Since the color reproducibility is excellent, blue light blocking properties are satisfactory, and the target product is visually observed via the spectacle lens, the observer hardly feels the change of the color.

EXAMPLES

Hereinafter, the present disclosure is specifically described with reference to examples and comparative examples. The materials, the amount of use, the proportion, the treatment content, the treatment procedure, and the like provided in the following examples can be appropriately changed without departing from the gist of the present disclosure. Accordingly, the scope of the present disclosure should not be construed as being limited by the following specific examples.

Example 1

(Preparation of Ultraviolet Curable Composition for Forming Coloring Agent-Containing Layer)

An ultraviolet curable composition 1 was prepared by mixing components described in the prescription of the ultraviolet curable composition 1 described below in described amounts.

(Prescription of Ultraviolet Curable Composition 1)

| | |
|---|---|
| Dye represented by Formula (1) (Example Compound: Y-1) [Specific dye] | 0.1 parts by mass |
| Polyfunctional acrylate (trade name: KAYARAD PET-30, manufactured by Nippon Kayaku Co., Ltd.) [Polymerizable compound] | 50 parts by mass |
| PEGMEA [organic solvent] | 100 parts by mass |
| Photopolymerization initiator [IRGACURE-819 (manufactured by BASF SE)] | 1 part by mass |

(Manufacturing of Protective Sheet)

A polyethylene terephthalate (PET) film (thickness: 125 μm) as a transparent support was bar-coated with the obtained ultraviolet curable composition 1 so as to form a coating layer of the ultraviolet curable composition 1, and the coating layer was dried under reduced pressure at 80° C. for 5 minutes.

Thereafter, irradiation was performed with ultraviolet light of 100 mW/cm$^2$ under a nitrogen atmosphere at room temperature by using an ultraviolet lamp to cure the coating layer, so as to form a coloring agent-containing layer.

The film thickness of the ultraviolet curable composition coating layer is adjusted such that the film thickness of the coating layer after drying is adjusted to a film thickness in which the transmittance of the specific dye (Y-1) at the maximum absorption wavelength became 50%. The content of the dye included in the obtained coloring agent-containing layer per unit area was 0.017 mmol/m$^2$. The content of the dye included in the coloring agent-containing layer per unit area is measured by the aforementioned method.

The polyethylene terephthalate film which was the transparent support is abbreviated as "PET" in Tables 1 to 3 below.

A surface on the opposite side of the transparent support of the coloring agent-containing layer was coated with a silicone-based pressure sensitive adhesive (DC7652 (trade name), manufactured by The Dow Corning Company) in an amount in which the film thickness after drying became 30 m, and the surface was dried to obtain a pressure sensitive layer, so as to obtain a protective sheet with the pressure sensitive layer of Example 1.

The maximum absorption wavelength of the protective sheet of Example 1 was measured by the aforementioned method, in consideration of the absorbability of the PET film which was a transparent support and the pressure sensitive layer, the maximum absorption wavelength of the dye included in the coloring agent-containing layer was calculated to be 480 nm, and the visible light transmittance of the coloring agent-containing layer at the wavelength of 480 nm which was calculated in the same manner was 50%.

(Evaluation of Protective Sheet)

1. Blue Light Blocking Properties

The visible light transmittance at the maximum absorption wavelength of the dye included in the coloring agent-containing layer was measured by using a protective sheet and a UV/vis spectrum meter (manufactured by Shimadzu Corporation, UV/vis spectrum meter UV3400). In a case where a plurality of dyes were included in the coloring agent-containing layer, based on 480 nm, the visible light transmittance at the maximum absorption wavelength closest to 480 nm was measured.

In the present specification, the visible light transmittance of this dye at the maximum absorption wavelength was defined as the transmittance of the blue light, and as the measured transmittance was lower, it was evaluated that the blue light blocking properties were satisfactory.

In a case where the transmittance of the blue light was 70% or less, it was evaluated that the blue light blocking effect was at a constant level. In a case where the transmittance of the blue light was less than 60%, it was evaluated that the blue light blocking effect was satisfactory, and in a case where the transmittance was 50% or less, and it was evaluated that the blue light blocking effect was satisfactory.

The measuring results are provided in Table 1.

2. Hue Evaluation

The protective sheet of Example 1 was placed on white paper and the tint was visually evaluated. As described above, in a case where the hue was yellow, it was evaluated that the influence on the image was small.

The evaluation results are provided in Table 1.

3. Image Reproducibility Evaluation 3-1. Reproducibility of White Image

A protective sheet was placed on the liquid crystal display to display a white image, and the tint was visually evaluated.

In a case where the image was observed as white, it was evaluated as satisfactory, and in a case where the image was observed as a color other than white, it was evaluated as defective.

3-2. Reproducibility of Full Color Image

A protective sheet was placed on the liquid crystal display to display a full color image, and the color reproducibility of the image was confirmed.

By visual observation, it was evaluated that the color reproducibility of the image was satisfactory in a case where there was no discomfort in the full color image compared with the case where the protective sheet was not arranged, and in a case where it was checked that the tint was clearly changed to change the color balance of the full color image, it was evaluated that the color reproducibility of the image was poor.

In a case where evaluation of both the white image and the full color image was satisfactory, it was determined to be "satisfactory" and in a case where at least one of the evaluation results was defective, it was determined to be "poor".

Example 2

Instead of the dye represented by Formula (1) (Example Compound:Y-1) used in the ultraviolet curable composition 1 for forming the coloring agent-containing layer used in Example 1, the ultraviolet curable composition was prepared in the same manner as in Example 1 except that the dye represented by Formula (2) (Example Compound: Z-4) was used, and the protective sheet of Example 2 was manufactured in the same manner as in Example 1 by using the obtained ultraviolet curable composition, and the evaluation was performed in the same manner as in Example 1. Results thereof are as presented in Table 1.

Examples 3 to 9 and Comparative Examples 1 to 3

Instead of the dye represented by Formula (1) (Example Compound: Y-1) used in the ultraviolet curable composition 1 for forming the coloring agent-containing layer used in Example 1, except that the dyes presented in Tables 1 and 2 were used, the protective sheet was manufactured in the same manner as in Example 1, and the evaluation was performed in the same manner as in Example 1.

The results thereof are provided in Tables 1 and 2.

The control of the light transmittance at the maximum absorption wavelength of the protective sheet was performed by adjusting the coating amount of the ultraviolet curable composition used, that is, the amount of the dye contained per unit area of the coloring agent-containing layer by the means for controlling the film thickness of the coloring agent-containing layer after curing. The film thicknesses of the coloring agent-containing layer were presented in Tables 1 to 2.

Details of the respective components in Tables 1, 2, and 3 described below were as below.

A content ratio in a case where two kinds of dyes were used was specific dye another dye=2:1 (mass ratio).

Dye (C-1): Oil Blue N (manufactured by Sigma-Aldrich Co. LLC.) [another dye: blue] Dye (H-1): Solvent Yellow 14 (manufactured by Sigma-Aldrich Co. LLC.) [another dye: yellow] Dye (H-2): Disperse Orange 1 (manufactured by Sigma-Aldrich Co. LLC.) [another dye: orange] Dye (H-3): Dye having the following structure [Another dye: pale yellow]

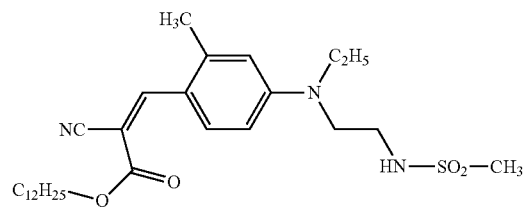

Polymerizable compound: KAYARAD TPA330 (polyfunctional acrylate, manufactured by Nippon Kayaku Co., Ltd.)

Photopolymerization initiator: IRGACURE-819 (manufactured by BASF SE) (abbreviated as "IRG-819" in Tables 1 to 3)

Photopolymerization initiator: IRGACURE-OXE01 (manufactured by BASF SE) (abbreviated as "OXE-01" in Tables 1 to 3)

Transparent support: polycarbonate film (thickness: 100 m) (abbreviated as "PC" in Tables 1 to 3)

TABLE 1

| | | | | Protective layer | | | | |
| --- | --- | --- | --- | --- | --- | --- | --- | --- |
| | Support | | | Colorant maximum | Colorant | | | |
| | Material | Thickness μm | Colorant | absorption wavelength | content mmol/m² | Polymerization compound | Polymerization initiator | Thickness |
| Example 1 | PET | 125 | Y-1 | 480 nm | 0.017 | Polyfunctional acrylate KAYARAD PET-30 | Photo-polymerization initiator IRG-819 | Adjusted such that maximum absorption wavelength of coloring agent becomes 50% |
| Example 2 | PET | 125 | Z-4 | 479 nm | 0.022 | Polyfunctional acrylate KAYARAD PET-30 | Photo-polymerization initiator IRG-819 | As above |
| Example 3 | PET | 125 | Y-1 C-1: OIL BLUE N | 480 nm 594, 644 nm | 0.04 | Polyfunctional acrylate KAYARAD PET-30 | Photo-polymerization initiator IRG-819 | As above |
| Example 4 | PET | 125 | Y-1 H-3 | 480 nm 432 nm | 0.055 | Polyfunctional acrylate KAYARAD PET-30 | Photo-polymerization initiator IRG-819 | As above |

TABLE 1-continued

| | | | | | | | | |
|---|---|---|---|---|---|---|---|---|
| Example 5 | PET | 125 | Y-1 | 480 nm | 0.017 | Polyfunctional acrylate KAYARAD PET-30 | Photo-polymerization initiator IRG-819 | Adjusted such that maximum absorption wavelength of coloring agent becomes 20% |

| | Pressure sensitive layer | | Evaluation | | |
|---|---|---|---|---|---|
| | Pressure sensitive adhesive | Thickness μm | Blue light blocking properties (transmittance) | Tint appearance | Image reproducibility |
| Example 1 | Silicon-based | 30 | 50% | Yellow | Satisfactory |
| Example 2 | Silicon-based | 30 | 50% | Yellow | Satisfactory |
| Example 3 | Silicon-based | 30 | 50% | Green | Satisfactory |
| Example 4 | Silicon-based | 30 | 50% | Yellow | Satisfactory |
| Example 5 | Silicon-based | 30 | 20% | Yellow | Satisfactory |

TABLE 2

| | Support | | | Protective layer | | | | |
|---|---|---|---|---|---|---|---|---|
| | Material | Thickness μm | Colorant | Colorant maximum absorption wavelength | Colorant content mmol/m² | Polymerization compound | Polymerization initiator | Thickness |
| Example 6 | PET | 75 | Y-1 | 480 nm | 0.017 | Polyfunctional acrylate KAYARAD PET-30 | Photo-polymerization initiator IRG-819 | Adjusted such that maximum absorption wavelength of coloring agent becomes 50% |
| Example 7 | PC | 100 | Y-1 | 480 nm | 0.017 | Polyfunctional acrylate KAYARAD PET-30 | Photo-polymerization initiator IRG-819 | As above |
| Example 8 | PET | 125 | Y-1 | 480 nm | 0.017 | KAYARAD TPA330 | Photo-polymerization initiator IRG-819 | As above |
| Example 9 | PET | 125 | Y-1 | 480 nm | 0.017 | Polyfunctional acrylate KAYARAD PET-30 | Photo-polymerization initiator OXE-01 | As above |
| Comparative Example 1 | PET | 125 | H-1 Solvent Yellow 14 | 476 nm | 0.017 | Polyfunctional acrylate KAYARAD PET-30 | Photo-polymerization initiator IRG-819 | Adjusted such that maximum absorption wavelength of coloring agent becomes 50% |
| Comparative Example 2 | PET | 125 | H-2 Disperse Orange 1 | 483 nm | 0.017 | Polyfunctional acrylate KAYARAD PET-30 | Photo-polymerization initiator IRG-819 | As above |
| Comparative Example 3 | PET | 125 | H-1 Solvent Yellow 14 | 479 nm | 0.017 | Polyfunctional acrylate KAYARAD PET-30 | Photo-polymerization initiator IRG-819 | Adjusted such that maximum absorption wavelength of coloring agent becomes 20% |

| | Pressure sensitive layer | | Evaluation | | |
|---|---|---|---|---|---|
| | Pressure sensitive adhesive | Thickness μm | Blue light blocking properties (transmittance) | Tint appearance | Image reproducibility |
| Example 6 | Silicon-based | 30 | 50% | Yellow | Satisfactory |
| Example 7 | Silicon-based | 30 | 50% | Yellow | Satisfactory |
| Example 8 | Silicon-based | 30 | 50% | Yellow | Satisfactory |
| Example 9 | Silicon-based | 30 | 50% | Yellow | Satisfactory |
| Comparative Example 1 | Silicon-based | 30 | 50% | Orange | Poor |
| Comparative Example 2 | Silicon-based | 30 | 50% | Brown | Poor |
| Comparative Example 3 | Silicon-based | 30 | 20% | Reddish brown | Poor |

From the results of Tables 1 to 2, in all of the protective sheets of the examples including the colorants including the specific dye, the transmittance of the blue light was 50% or less, the blue light blocking properties were excellent, the tint was yellow, and the color reproducibility of the image was satisfactory.

On the other hand, with respect to the dyes other than the specific dye, in Comparative Examples 1 to 3 in which a yellow dye or an orange dye was used, the blocking properties of the blue light were the same as in the examples, but the tints of the protective sheets became orange, brown, and reddish brown, and thus the color reproducibility of the image was deteriorated in all cases.

Example 10

(Preparation of Ultraviolet Curable Composition 2 for Forming Coloring Agent-Containing Layer)

An esterified product of a maleic acid anhydride adduct of polyisoprene polymer and 2-hydroxyethyl methacrylate (trade name: UC203, manufactured by Kuraray Co., Ltd., molecular weight of 36,000)

| | |
|---|---|
| [Curable resin] | 21.8 parts by mass |
| Polybutadiene (trade name: Polyvest110, manufactured by Evonik Japan Co., Ltd.) [Rubber component] | 11.4 parts by mass |
| Dicyclopentenyloxyethyl methacrylate (trade name: FA512M, Hitachi Chemical Co., Ltd.) [Pressure sensitive adhesive] | 5 parts by mass |
| 2-ethylhexy methacrylate (Wako Pure Chemical Industries, Ltd.) | 20 parts by mass |
| Hydrogenated terpene-based resin (trade name: CLEARON P-135, Yasuhara Chemical Co., Ltd.) [viscosity imparting agent] | 38.8 parts by mass |
| Dye represented by Formula (1) (Example Compound: Y-1) [Specific dye] | 0.1 parts by mass |

Each of the above components was kneaded in a constant temperature tank at 130° C. in a kneader, the temperature of the constant temperature tank was adjusted to 80° C., 0.6 parts by mass of a photopolymerization initiator (trade name: Lucirin TPO, manufactured by BASF SE) and 2.4 parts by mass of a photopolymerization initiator (trade name IRGACURE-184, manufactured by BASF SE) were introduced and kneaded in a kneader, so as to prepare an ultraviolet curable composition 2 for forming the coloring agent-containing layer containing the pressure sensitive adhesive.

(Manufacturing of Coloring Agent-Containing Layer Having Pressure Sensitive Properties)

A PET film (thickness: 125 m) which was a transparent support and which was the same as used in Example 1 was coated with the obtained ultraviolet curable composition 2, in an amount in which the film thickness after curing became 80 m, the opposite side to the transparent support of the coating film of the obtained ultraviolet curable composition 2 was irradiated with ultraviolet rays in the intensity in which the irradiation energy became 1 J/cm$^2$ for curing by using a metal halide UV lamp (manufactured by Heraeus Holding GmbH), so as to obtain a protective sheet of Example 10 in which the coloring agent-containing layer having the pressure sensitive properties was formed.

In Example 10, a plasma surface treatment was performed in advance on the surface on the side of the PET film which was a transparent support and which was coated with the ultraviolet curable composition 2.

The thickness of the coloring agent-containing layer including the pressure sensitive adhesive of the protective sheet of Example 10 was measured by using a film thickness meter SWT-9000 manufactured by Sanko Electronic Laboratory Co., Ltd., and the thickness was 80 μm.

Example 11

The protective sheet of Example 11 was manufactured in the same manner as in Example 10 except that the thickness after curing the coloring agent-containing layer formed by the ultraviolet curable composition 2 for forming the coloring agent-containing layer used in Example 10 was changed from 80 m to 50 m.

The obtained protective sheet was evaluated in the same manner as in Example 1. The result was provided in Table 3 as below.

Comparative Example 4

The protective sheet was manufactured in the same manner as in Example 10 except that the dye presented in Table 3 was used instead of the dye represented by Formula (1) (Example Compound: Y-1) used in the ultraviolet curable composition 2 for forming the coloring agent-containing layer used in Example 10, and the evaluation was performed in the same manner as in Example 1. The result was provided in Table 3 as below.

TABLE 3

| | Support | | Colorant layer including pressure sensitive adhesive | | | |
|---|---|---|---|---|---|---|
| | | | | Colorant | | |
| | Material | Thickness μm | Colorant | Colorant maximum absorption wavelength | content mmol/m$^2$ | Polymerization compound |
| Example 10 | PET | 125 | Y-1 | 480 nm | 0.017 | UC-203 Polyvest110 FA512M |
| Example 11 | PET | 125 | Y-1 | 480 nm | 0.017 | UC-203 Polyvest110 FA512M |
| Comparative Example 4 | PET | 125 | H-1 Solvent Yellow 14 | 476 nm | 0.017 | UC-203 Polyvest110 FA512M |

TABLE 3-continued

| | Colorant layer including pressure sensitive adhesive | | | Evaluation | | |
|---|---|---|---|---|---|---|
| | Polymerization initiator | Pressure sensitive adhesive | Thickness μm | Blue light blocking properties (transmittance) | Tint appearance | Image reproducibility |
| Example 10 | Photopolymerization initiator Lucirin TPO IRGACURE 184 | CLEARON P-135 | 80 μm | 45% | Yellow | Satisfactory |
| Example 11 | Photopolymerization initiator Lucirin TPO IRGACURE 184 | CLEARON P-135 | 50 μm | 68% | Yellow | Satisfactory |
| Comparative Example 4 | Photopolymerization initiator Lucirin TPO | CLEARON P-135 | 80 μm | 50% | Orange | Poor |

From the results of Table 3, in all of the protective sheets in the examples including the coloring agent-containing layers each including the specific dye and the pressure sensitive adhesive, that is, the coloring agent-containing layers having pressure sensitive properties, the transmittance of the blue light satisfied the level of 70% or less, and particularly in Example 10, the transmittance of the blue light was 50% or less, and the blue light blocking properties were excellent. In all of the protective sheets, the tint was yellow, and the color reproducibility of the image was satisfactory.

Meanwhile, in Comparative Example 4 in which the yellow dye was used as the dye other than the specific dye, the blocking properties of blue light were the same as in the examples, but the tint of the protective sheet was visually observed as orange, and thus the color reproducibility of the image was deteriorated.

Example 12

(Manufacturing of Plastic Lens)

A plastic lens formed with polythiourethane was prepared. The plastic lens was visually transparent.

The other side of the plastic lens was coated with the ultraviolet curable composition 1 for forming the coloring agent-containing layer manufactured in Example 1, so as to form the coating layer of the ultraviolet curable composition 1.

The film thickness of the coating layer of the ultraviolet curable composition 1 is adjusted such that the film thickness of the coating layer after drying is adjusted to a film thickness in which the transmittance of the specific dye (Y-1) at the maximum absorption wavelength became 50%.

The formed coating layer was dried at 80° C. for 5 minutes under the reduced pressure condition of 10 hPa ($1.0 \times 10^3$ Pa). Thereafter, irradiation with ultraviolet light of 100 mW/cm$^2$ was performed under a nitrogen atmosphere at room temperature by using an ultraviolet lamp to cure the coating layer, so as to obtain a spectacle lens having the coloring agent-containing layer on the surface of the plastic lens.

The tint of the spectacle lens of Example 12 provided with the coloring agent-containing layer containing the obtained specific dye was yellow.

Example 13

(Manufacturing Spectacles and Evaluation)

The spectacle lens manufactured in Example 12 was mounted on a spectacle frame to manufacture spectacles of Example 13.

Two evaluation monitors wore the obtained spectacles and continuously looked at the display in the image display device for three hours. As a result, all of the evaluation monitors evaluated not to feel the fatigue of the eye.

In a case where the image of the display was visually seen via the spectacle lens, the evaluation monitors evaluated to hardly feel the change of the tint.

Comparative Example 5

A plastic lens formed of the polythiourethane used for manufacturing the spectacle lens of Example 12 was prepared. Spectacles of Comparative Example 5 were manufactured by mounting the plastic lens to the spectacle frame without forming the coloring agent-containing layer in Example 12.

Two evaluation monitors wore the obtained spectacles and continuously looked at the display in the image display device in the same condition as in Example 13 for three hours, and all of the evaluation monitors evaluated to feel the fatigue in the eyes.

From the comparison between Example 13 and Comparative Example 5, in the spectacles of Example 13 using the spectacle lenses of Example 12, an effect of reducing the fatigue in the eyes in a case where the display in the image display device was looked at for a long period of time was checked. It is considered that the reduction of the fatigue in the eyes is an effect caused by the fact that the blue light blocking properties by the spectacle lens of Example 12 including the coloring agent-containing layer containing the specific dye mounted in the spectacles of Example 13 was satisfactory.

Example 14

(Manufacturing of Plastic Lens)

An ultraviolet curable composition 3 for forming the coloring agent-containing layer obtained by adding 1 part by mass an ultraviolet absorbing agent UV-1 having the following structure with respect to 100 parts by mass of the ultraviolet curable composition 1 manufactured in Example 1 was manufactured.

A plastic lens was manufactured in the same operation as in Example 12 by using the obtained ultraviolet curable composition 3. The tint of this lens was yellow.

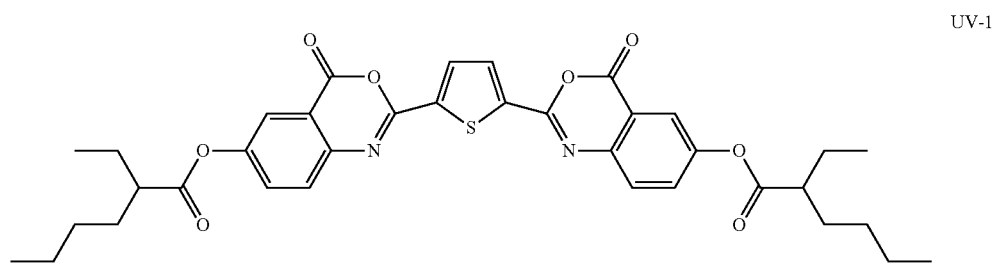 [SMILES: CCCCC(CC)C(=O)Oc1ccc2nc(-c3ccc(-c4nc5ccc(OC(=O)C(CC)CCCC)cc5c(=O)o4)s3)oc(=O)c2c1]

UV-1

(Manufacturing Spectacles and Evaluation)

The manufactured spectacle lens was mounted on a spectacle frame to manufacture spectacles of Example 14.

Two evaluation monitors wore the obtained spectacles and continuously looked at the display in the image display device for three hours, in the same manner as in Example 13, all of the evaluation monitors evaluated not to feel the fatigue in the eyes.

In a case where the image of the display was visually seen via the spectacle lens, all of the evaluation monitors evaluated to hardly feel the change of the tint.

Example 15

A plastic lens (spectacle lens) was manufactured in the same operation as in Example 14 except that the ultraviolet absorbing agent UV-1 in the ultraviolet curable composition 3 for forming the coloring agent-containing layer used in Example 14 was changed to an ultraviolet absorbing agent UV-3 having the following structure. The tint of the obtained lens was yellow.

The obtained spectacle lens was mounted on a spectacle frame, spectacles were manufactured, and the evaluation was performed in the same manner as in Example 14. As a result, all of the evaluation monitors wearing the spectacles evaluated not to feel the fatigue in the eye. In a case where the image of the display was visually seen via the spectacle lens, all of the evaluation monitors evaluated to hardly feel the change of the tint.

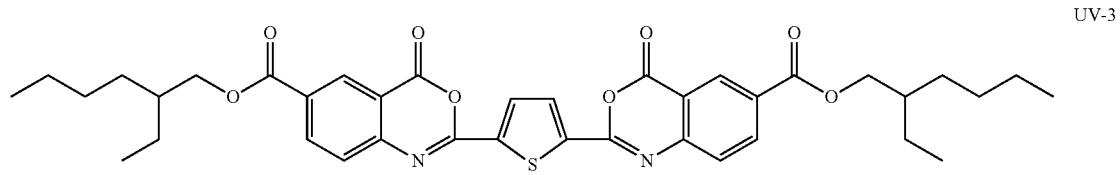 [SMILES: CCCCC(CC)COC(=O)c1ccc2nc(-c3ccc(-c4nc5ccc(C(=O)OCC(CC)CCCC)cc5c(=O)o4)s3)oc(=O)c2c1]

UV-3

Example 16

A plastic lens was manufactured in the same operation as in Example 14 except that the ultraviolet absorbing agent UV-1 in the ultraviolet curable composition 3 for forming the coloring agent-containing layer used in Example 14 was changed to an ultraviolet absorbing agent UV-4 having the following structure. The tint of the obtained lens was yellow.

The obtained spectacle lens was mounted on a spectacle frame, spectacles were manufactured, and the evaluation was performed in the same manner as in Example 14. As a result, all of the evaluation monitors wearing the spectacles evaluated not to feel the fatigue in the eye. In a case where the image of the display was visually seen via the spectacle lens, all of the evaluation monitors evaluated to hardly feel the change of the tint.

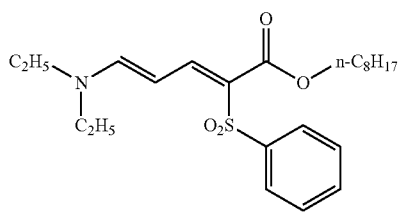

Example 17

A plastic lens (spectacle lens) was manufactured in the same operation as in Example 14 except that the ultraviolet absorbing agent UV-1 in the ultraviolet curable composition 3 for forming the coloring agent-containing layer used in Example 14 was changed to an ultraviolet absorbing agent UV-6 having the following structure. The tint of the obtained lens was yellow.

The obtained spectacle lens was mounted on a spectacle frame, spectacles were manufactured, and the evaluation was performed in the same manner as in Example 14. As a result, all of the evaluation monitors wearing the spectacles evaluated not to feel the fatigue in the eye. In a case where the image of the display was visually seen via the spectacle lens, all of the evaluation monitors evaluated to hardly feel the change of the tint.

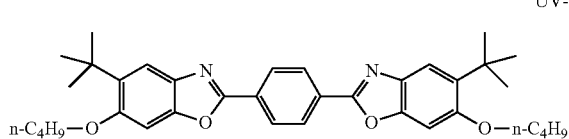

Example 18

A plastic lens (spectacle lens) was manufactured in the same operation as in Example 14 except that the ultraviolet absorbing agent UV-1 in the ultraviolet curable composition 3 for forming the coloring agent-containing layer used in Example 14 was changed to an ultraviolet absorbing agent UV-9 having the following structure. The tint of the obtained lens was yellow.

The obtained spectacle lens was mounted on a spectacle frame, spectacles were manufactured, and the evaluation was performed in the same manner as in Example 14. As a result, all of the evaluation monitors wearing the spectacles evaluated not to feel the fatigue in the eye. In a case where the image of the display was visually seen via the spectacle lens, all of the evaluation monitors evaluated to hardly feel the change of the tint.

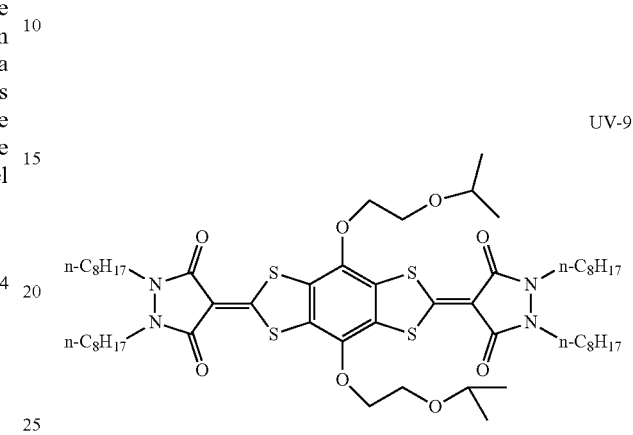

From the evaluation results of Examples 14 to 18, in a case where spectacle in which the spectacle lenses of the examples mounted were used, it was checked that fatigue in the eyes was not felt even in a case where the display image of the display was continuously looked at for three hours. Accordingly, since the resin composition used for forming the spectacle lens contains the specific dye relating to the present disclosure, it was checked that even in a case where the type of ultraviolet absorbing agent used in combination was changed, the blue light blocking properties by the spectacle lens was satisfactory. It was checked that, even in a case where blue light blocking properties were satisfactory, a change in the tint of the image was not observed, and performances in a case where the spectacle lens of the example was applied to the spectacle were satisfactory.

Example 19

100 parts by mass of a polycarbonate resin composition (CALIBRE 200-13: trade name, manufactured by Sumitomo Dow Limited), 0.001 parts by mass of the specific dye (Y-1), and 0.1 parts by mass of an ultraviolet absorbing agent UV-2 having the following structure were mixed, and a pellet-shaped resin composition was obtained by a single screw extruder.

The obtained pellet-shaped resin composition was formed into a lens shape by an injection molding machine (SG-50: trade name, manufactured by Sumitomo Heavy Industries, Ltd.) so as to obtain a plastic lens (spectacle lens). The tint of the obtained lens was yellow.

The obtained spectacle lens was mounted on a spectacle frame, spectacles were manufactured, and the evaluation was performed in the same manner as in Example 14. As a result, all of the evaluation monitors wearing the spectacles evaluated not to feel the fatigue in the eye. In a case where the image of the display was visually seen via the spectacle lens, all of the evaluation monitors evaluated to hardly feel the change of the tint.

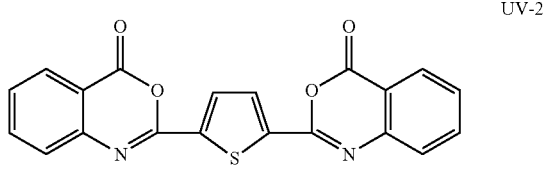

UV-2

Example 20

100 parts by mass of a thiourethane resin monomer (MR-8: trade name, Mitsui Chemicals, Inc.), 0.001 parts by mass of the specific dye (Y-1), 0.1 parts by mass of the ultraviolet absorbing agent UV-4 having the following structure, and 0.01 parts by mass of dibutyltin dichloride as the curing agent were mixed, charged into a mold, and heated at 130° C. for two hours, for polymerization and curing, so as to obtain a plastic lens (spectacle lens). The tint of the obtained lens was yellow.

The obtained spectacle lens was mounted on a spectacle frame, spectacles were manufactured, and the evaluation was performed in the same manner as in Example 14. As a result, all of the evaluation monitors wearing the spectacles evaluated not to feel the fatigue in the eye. In a case where the image of the display was visually seen via the spectacle lens, all of the evaluation monitors evaluated to hardly feel the change of the tint.

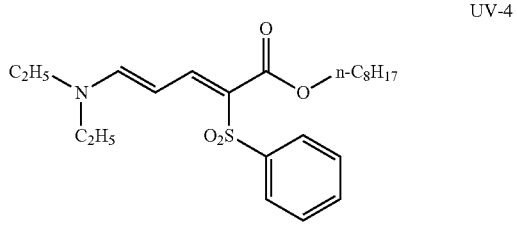

UV-4

Example 21

100 parts by mass of a diethylene glycol bisallyl carbonate resin (CR-39: trade name, manufactured by PPG Industries Inc.), 0.001 parts by mass of the specific dye (Y-4), and 0.1 parts by mass of the ultraviolet absorbing agent having the above structure were mixed, and a pellet-shaped resin composition was obtained by a single screw extruder. The obtained pellet-shaped resin composition was introduced into an injection molding machine and was formed into a lens shape so as to obtain a plastic lens (spectacle lens). The tint of the obtained lens was yellow.

The obtained spectacle lens was mounted on a spectacle frame, spectacles were manufactured, and the evaluation was performed in the same manner as in Example 14. As a result, all of the evaluation monitors evaluated not to feel the fatigue of the eye. In a case where the image of the display was visually seen via the spectacle lens, all of the evaluation monitors evaluated to hardly feel the change of the tint.

Example 22

90 parts by mass of bis(2,3-epithiopropyl) disulfide, 10 parts by mass of bis(2-mercaptoethyl) sulfide, 0.001 parts by mass of the specific dye (Y-4), and 0.1 parts by mass of the UV absorbing agent UV-1 were mixed having the following structure, and the mixture was charged into a mold and was heated at 120° C. for three hours in the mold for polymerization and curing, so as to obtain a plastic lens (spectacle lens). The tint of the obtained lens was yellow.

The obtained spectacle lens was mounted on a spectacle frame, spectacles were manufactured, and the evaluation was performed in the same manner as in Example 14. As a result, all of the evaluation monitors wearing the spectacles evaluated not to feel the fatigue in the eye. In a case where the image of the display was visually seen via the spectacle lens, all of the evaluation monitors evaluated to hardly feel the change of the tint.

From the evaluation results of Examples 19 to 22, in a case where spectacle in which the spectacle lenses of the examples mounted were used, it was checked that fatigue in the eyes was not felt even in a case where the display image of the display was continuously looked at for three hours.

Accordingly, it was checked that, since the resin in the resin composition used for forming the spectacle lens contains the specific dye according to the present disclosure, a thermoplastic resin material in which the type of a resin material as a substrate is a polymer compound, even in a case where a lens is obtained by injection molding, the resin material is a monomer which is a resin precursor, and even in a case where the lens was a thermosetting resin obtained by molding, the blue light blocking properties by the obtained spectacle lens was satisfactory.

With respect to the spectacle lens of the present disclosure, even in a case where the blue light blocking properties were satisfactory, the changes of the tint of the image were not observed.

Accordingly, it was understood that all of the spectacle lenses of Examples 19 to 22 using various resins generally used for forming spectacle lenses had satisfactory performance in a case of being applied to the spectacles.

The disclosures of JP2016-066812 filed on Mar. 29, 2016, JP2016-169842 filed on Aug. 31, 2016, and JP2016-212257 filed on Oct. 28, 2016 are incorporated into the present specification as reference.

All documents, patent applications, and technical standards described in the present specification are hereby incorporated by reference in their entirety to the same extent as if each individual document, patent application, and a technical standard were specifically and individually indicated to be incorporated by reference.

What is claimed is:

1. A protective sheet comprising:

a transparent support; and a coloring agent-containing layer that is arranged on at least one surface of the transparent support;

wherein the coloring agent-containing layer is a cured product of a curable composition including at least one dye selected from the group consisting of a dye represented by Formula (1) and a dye represented by Formula (2), a polymerizable compound, and a polymerization initiator,

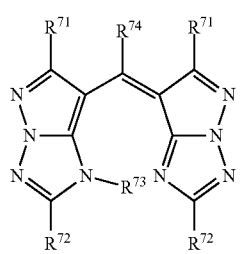

(1)

in Formula (1), $R^{71}$, $R^{72}$, $R^{73}$, and $R^{74}$ each independently represent a hydrogen atom, an alkyl group, an alkoxy group, an alkoxycarbonyl group, a carbamoyl group, a sulfamoyl group, a cyano group, an aryl group, or a heteroaryl group,

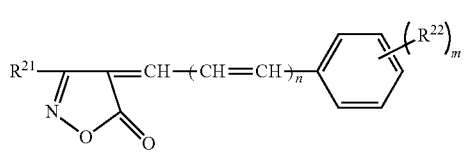

(2)

in Formula (2), $R^{21}$ represents an alkyl group, an aryl group, a heterocyclic group, a carboxyl group, an alkoxycarbonyl group, an aryloxycarbonyl group, a carbamoyl group, or a cyano group, $R^{22}$ represents a hydrogen atom, a halogen atom, an alkyl group, an alkoxy group, a hydroxy group, an amino group, a carbamoyl group, a sulfamoyl group, or an alkoxycarbonyl group, $R^{22}$ may form a 5-membered or 6-membered fused ring together with a benzene ring to which $R^{22}$ is bonded, and n represents 0 or 1, and m represents an integer of 1 to 5, where, at least one of $R^{21}$ or $R^{22}$ is an alkyl group having 4 or more carbon atoms, and in a case where m is 2 to 5, a plurality of $R^{22}$'s may be identical to or different from each other.

2. The protective sheet according to claim 1,
wherein, in at least one dye selected from the group consisting of the dye represented by Formula (1) and the dye represented by Formula (2), a maximum absorption wavelength is in a range of 450 nm to 500 nm, and visible light transmittance at the maximum absorption wavelength is less than 60%.

3. The protective sheet according to claim 1,
wherein the coloring agent-containing layer further includes a pressure sensitive adhesive.

4. The protective sheet according to claim 1, further comprising:
a colorant different from at least one dye selected from the group consisting of the dye represented by Formula (1) and the dye represented by Formula (2).

5. An image display device comprising:
the protective sheet according to claim 1.

6. A spectacle lens comprising:
a transparent lens; and
a coloring agent-containing layer that is arranged on at least one surface of the transparent lens;
wherein the coloring agent-containing layer is a cured product of a curable composition including at least one dye selected from the group consisting of a dye represented by Formula (1) and a dye represented by Formula (2), a polymerizable compound, and a polymerization initiator,

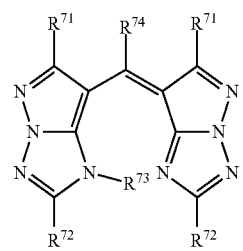

(1)

in Formula (1), $R^{71}$, $R^{72}$, $R^{73}$, and $R^{74}$ each independently represent a hydrogen atom, an alkyl group, an alkoxy group, an alkoxycarbonyl group, a carbamoyl group, a sulfamoyl group, a cyano group, an aryl group, or a heteroaryl group,

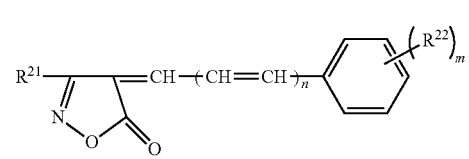

(2)

in Formula (2), $R^{21}$ represents an alkyl group, an aryl group, a heterocyclic group, a carboxyl group, an alkoxycarbonyl group, an aryloxycarbonyl group, a carbamoyl group, or a cyano group, $R^{22}$ represents a hydrogen atom, a halogen atom, an alkyl group, an alkoxy group, a hydroxy group, an amino group, a carbamoyl group, a sulfamoyl group, or an alkoxycarbonyl group, $R^{22}$ may form a 5-membered or 6-membered fused ring together with a benzene ring to which $R^{22}$ is bonded, and n represents 0 or 1, and m represents an integer of 1 to 5, where, at least one of $R^{21}$ or $R^{22}$ is an alkyl group having 4 or more carbon atoms, and in a case where m is 2 to 5, a plurality of $R^{22}$'s may be identical to or different from each other.

7. The spectacle lens according to claim 6,
wherein, in at least one dye selected from the group consisting of the dye represented by Formula (1) and the dye represented by Formula (2), a maximum absorption wavelength is in a range of 450 nm to 500 nm, and visible light transmittance at the maximum absorption wavelength is less than 60%.

8. The spectacle lens according to claim 6,
wherein the coloring agent-containing layer is a sol-gel film.

9. The spectacle lens according to claim 6,
wherein the transparent lens includes at least one dye selected from the group consisting of the dye represented by Formula (1) and the dye represented by Formula (2).

10. The spectacle lens according to claim 6, further comprising:

a colorant different from at least one dye selected from the group consisting of the dye represented by Formula (1) and the dye represented by Formula (2).

11. Spectacles comprising:

the spectacle lens according to claim 6.

* * * * *